(12) United States Patent
Zhao et al.

(10) Patent No.: US 12,085,989 B2
(45) Date of Patent: Sep. 10, 2024

(54) FLEXIBLE DISPLAY DEVICE AND DISPLAY SYSTEM

(71) Applicant: KunShan Go-Visionox Opto-Electronics Co., Ltd, Jiangsu (CN)

(72) Inventors: Yongfeng Zhao, Kunshan (CN); Fu Liao, Kunshan (CN); Junfeng Li, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 316 days.

(21) Appl. No.: 17/857,571

(22) Filed: Jul. 5, 2022

(65) Prior Publication Data

US 2022/0338361 A1    Oct. 20, 2022

Related U.S. Application Data

(63) Continuation of application No. PCT/CN2020/099533, filed on Jun. 30, 2020.

(51) Int. Cl.
*G06F 1/16* (2006.01)
(52) U.S. Cl.
CPC .......... *G06F 1/1652* (2013.01); *G06F 1/1601* (2013.01)
(58) Field of Classification Search
CPC ....................................................... H05K 5/00
See application file for complete search history.

(56) References Cited

U.S. PATENT DOCUMENTS

| | | |
|---|---|---|
| 2008/0013172 A1 | 1/2008 | Nakamura et al. |
| 2016/0187929 A1 | 6/2016 | Kim et al. |
| 2017/0196102 A1 | 7/2017 | Shin et al. |
| 2018/0103551 A1 | 4/2018 | Park |
| 2019/0364676 A1* | 11/2019 | Lee ............... H05K 5/0221 |
| 2020/0103476 A1* | 4/2020 | Shin ................ G09F 9/301 |

FOREIGN PATENT DOCUMENTS

| | | |
|---|---|---|
| CN | 1784124 A | 6/2006 |
| CN | 101241264 A | 8/2008 |
| CN | 105096743 A | 11/2015 |
| CN | 106251779 A | 12/2016 |

(Continued)

OTHER PUBLICATIONS

Office Action issued on Sep. 26, 2023, in corresponding Chinese Application No. 202080087189.6, 7 pages.

(Continued)

*Primary Examiner* — Jerry Wu
(74) *Attorney, Agent, or Firm* — Maier & Maier, PLLC

(57) ABSTRACT

One or more embodiments of the description relate to a flexible display device and a display system. The flexible display device includes: a display screen body; a functional auxiliary structure connected to the display screen body to provide isolation in case that the display screen body curls up and/or support in case that the display screen body is unfolded. The functional auxiliary structure includes an isolation component and/or a support component. The support component is capable of isolating at least a part of the display screen body in a curled state; the support component is capable of providing support for the display screen body in an unfolded state.

19 Claims, 32 Drawing Sheets

(56) References Cited

FOREIGN PATENT DOCUMENTS

| | | | |
|---|---|---|---|
| CN | 107170370 A | 9/2017 |
| CN | 107256679 A | 10/2017 |
| CN | 108447402 A | 8/2018 |
| CN | 110185895 A | 8/2019 |
| CN | 110599911 A | 12/2019 |
| CN | 110910767 A | 3/2020 |
| JP | 2005156682 A | 6/2005 |
| KR | 20090036265 A | 4/2009 |
| KR | 20160149600 A | 12/2016 |

OTHER PUBLICATIONS

Office Action issued on May 25, 2023, in corresponding Chinese Application No. 202080087189.6 (Partial English translation provided), 13 pages.
International Search Report (with English Translation) and Written Opinion of the International Searching Authority mailed Apr. 1, 2021, in corresponding International Application No. PCT/CN2020/099533, 11 pages.

* cited by examiner

FLEXIBLE DISPLAY DEVICE AND DISPLAY SYSTEM

CROSS REFERENCE TO RELATED APPLICATION

This application is a continuation of International Application No. PCT/CN2020/099533 filed on Jun. 30, 2020 and entitled "FLEXIBLE DISPLAY DEVICE AND DISPLAY SYSTEM", the disclosure of which is incorporated herein by reference in its entirety.

TECHNICAL FIELD

The application relates to the technical field of display screen, and in particular to a flexible display device and a display system.

BACKGROUND

With the development of display technology, flexible display devices are gradually entering the market. A flexible display device may be unfolded when it is needed and retracted by curling when it is not needed. The flexible display device has an extremely thin, deformable characteristic, and an ultra flexibility characteristic make it possible for the display screen body to be rolled into a cylindrical shape, facilitating storage and package and easy to carry.

Based on a stress distribution after the flexible display device is curled, when the rollable flexible display device is unfolded, the flexible display device is possibly incapable of keeping flat, thereby affecting display effect. Once the display screen is scratched or abraded, the display effect of the flexible display device is also affected.

Therefore, it is necessary to provide a functional auxiliary structure applicable to the flexible display device, in order to enable reducing of abrasion or deformation of the flexible display device.

SUMMARY

One or more embodiments of the description relate to a flexible display device including: a display screen body; a functional auxiliary structure connected to the display screen body to provide isolation in case that the display screen body curls up and/or support in case that the display screen body is unfolded.

In some embodiments, the functional auxiliary structure includes an isolation component, and at least a part of the display screen body in a curled state is isolated by the isolation component.

In some embodiments, the isolation component includes a spiral groove, and when the display screen body is required to curl up, the display screen body enters and moves in the spiral groove.

In some embodiments, the isolation component includes a draw bar connected to the display screen body, and the display screen body enters and moves in the spiral groove via the draw bar.

In some embodiments, the spiral groove includes a first spiral groove and a second spiral groove which are arranged coaxially, and the display screen body enters and moves in the first spiral groove and the second spiral groove.

In some embodiments, a ratio of a length of the spiral groove in an axial direction thereof to a length of the display screen body in a second direction is 0.5-1.

In some embodiments, a middle portion of a starting end of the display screen body is received in the spiral groove.

In some embodiments, the flexible display device further includes a rotation shaft, and a groove body of the spiral groove is spirally distributed around an axis of the rotation shaft in a plane perpendicular to the rotation shaft.

In some embodiments, the rotation shaft is further encircled by a first spring to provide a first draw force to the rotation shaft in a first rotation direction.

In some embodiments, a second spring is further provided between the draw bar and the rotation shaft to provide a second draw force to the draw bar toward a center of the spiral groove.

In some embodiments, the spiral groove has an inner wall with an undulated shape in a direction parallel to the axis.

In some embodiments, the undulated shape includes at least one of a wavy shape, a crenelated shape, and a serrated shape.

In some embodiments, the draw bar has an outer wall with a shape matching the undulated shape in an axial direction thereof.

In some embodiments, the spiral groove further includes a slide auxiliary structure for reducing a frictional force when the draw bar slides in the spiral groove.

In some embodiments, the slide auxiliary structure includes a ball disposed on an inner wall of the spiral groove, and the ball is rotatably exposed in the spiral groove.

In some embodiments, the slide auxiliary structure includes a polished layer and/or a lubricate coating disposed on an inner wall of the spiral groove.

In some embodiments, the flexible display device further includes a blocking structure configured to prevent the draw bar from sliding out of the spiral groove.

In some embodiments, the blocking structure includes a first blocking member disposed at an outfall of the spiral groove, and the first blocking member completely or partially covers the outfall.

In some embodiments, the first blocking member is movable between a first position and a second position, in the first position, the first blocking member at least partially blocks the outfall, and in the second position, the outfall is not blocked by the first blocking member to be completely exposed from the first blocking member.

In some embodiments, the blocking structure further includes a cover disposed at an end of the rotation shaft, and the cover covers at least a part of the outfall.

In some embodiments, the flexible display device further includes a resilient lever disposed between the draw bar and the rotation shaft, and the resilient lever is resilient in a radial direction of the spiral groove.

In some embodiments, a width of a groove body space of the spiral groove has a numerical value ranging from 0.1 mm-1 mm.

In some embodiments, a groove body wall thickness of the spiral groove has a numerical value ranging from 0.1 mm-2 mm.

In some embodiments, the isolation component includes a bordure structure disposed on the display screen body.

In some embodiments, the bordure structure includes a bordure disposed on a first side and/or a second side of the display screen body.

In some embodiments, the bordure is connected with the display screen body by hot press molding or liquid curing or adhesive connection or magnetic connection.

In some embodiments, the bordure is provided with a plurality of notches disposed on a front surface or a back surface of the display screen body.

In some embodiments, the plurality of notches have a shape including at least one of a wavy shape, a crenelated shape, and a serrated shape.

In some embodiments, the notch has a width of 0.1 mm-10 mm in an unfolded state of the screen body, and the notch has a depth of 0.1 mm-3 mm.

In some embodiments, a spacing between two adjacent notches is 0.1 mm-10 mm.

In some embodiments, a material of the bordure includes at least one of thermoplastic polyurethane elastomer, silica gel, rubber, polyimide, polyvinyl chloride, and polyethylene terephthalate.

In some embodiments, the functional auxiliary structure includes a support component including a support member detachably connected to the display screen body; the support member engages with the display screen body when the flexible display device is in an unfolded state; the support member is at least partially separated from the display screen body when the flexible display device is in a curled state.

In some embodiments, the flexible display device includes a rotation shaft, and the support component includes a rotation member; a starting end of the display screen body is connected to the rotation shaft, a first end of the support member is connected to the rotation member, and a tail end of the display screen body is connected to a second end of the support member.

In some embodiments, the support component includes a transmission component disposed between the display screen body and the support member, and the transmission component includes a rotation gear connected to the rotation shaft, an inner ring gear disposed on the rotation member, and an intermediate gear disposed between the rotation gear and the inner ring gear to engage with both the rotation gear and the inner ring gear.

In some embodiments, the flexible display device further includes a drive component for driving the rotation shaft to rotate.

In some embodiments, a material of the support member includes at least one of thermoplastic polyurethane elastomer, silica gel, rubber, polyimide, polyvinyl chloride, and polyethylene terephthalate.

In some embodiments, the functional auxiliary structure includes a liquid spray structure, and the flexible display device further includes a rotation shaft connected to a starting end of the display screen body; the liquid spray structure includes: a swing lever connected to the rotation shaft, a liquid storage bag in contact with a free end of the swing lever and including a liquid outfall; the display screen body pass a front side of the liquid outfall during unfolding; wherein the rotation shaft rotates to drive the swing lever to reciprocate to spray a liquid in the liquid storage bag from the liquid outfall.

In some embodiments, the liquid spray structure further includes a rotation eccentric member rotatably connected to the rotation shaft; the drive lever is connected to the rotation eccentric member, and the rotation eccentric member moves with the rotation shaft to drive the drive lever to reciprocate.

In some embodiments, a slide groove is provided in the swing lever, and the rotation eccentric member is connected to the swing lever via the slide groove.

In some embodiments, the liquid outfall faces toward an outfall of the spiral groove.

In some embodiments, a free end of the swing lever is provided with a press portion, the liquid spray structure further includes a rail portion, the liquid storage bag is located at the rail portion, the rail portion includes a rail groove, the press portion includes a first press member and a press connecting member, and two ends of the press connecting member are rotatably connected to the first press member and the free end of the swing lever respectively; wherein the first press member is slidable in the rail groove to press the liquid storage bag.

In some embodiments, the rail portion includes a guide curved surface having a curved shape corresponding to a reciprocating motion trajectory of the free end of the swing lever.

In some embodiments, the press portion includes a second press member disposed at the free end of the swing lever, and the second press member is rotatably connected to the free end of the swing lever.

In some embodiments, the liquid spray structure is disposed at two ends of the rotation shaft.

In some embodiments, a ratio of a length of the liquid outfall of the liquid storage bag parallel to the second direction to a width of the display screen body is 0.5-1.

In some embodiments, the first press member includes a roller.

In some embodiments, a length of the roller in an axial direction thereof is longer than a length of the liquid storage bag parallel to the second direction.

BRIEF DESCRIPTION OF THE DRAWINGS

This application will be further illustrated by way of exemplary embodiments, and the exemplary embodiments will be described in detail with reference to the accompanying drawings. The embodiments are not intended to be limiting. In the embodiments, like numerals refer to like structures, wherein.

DETAILED DESCRIPTION

Figure 1:
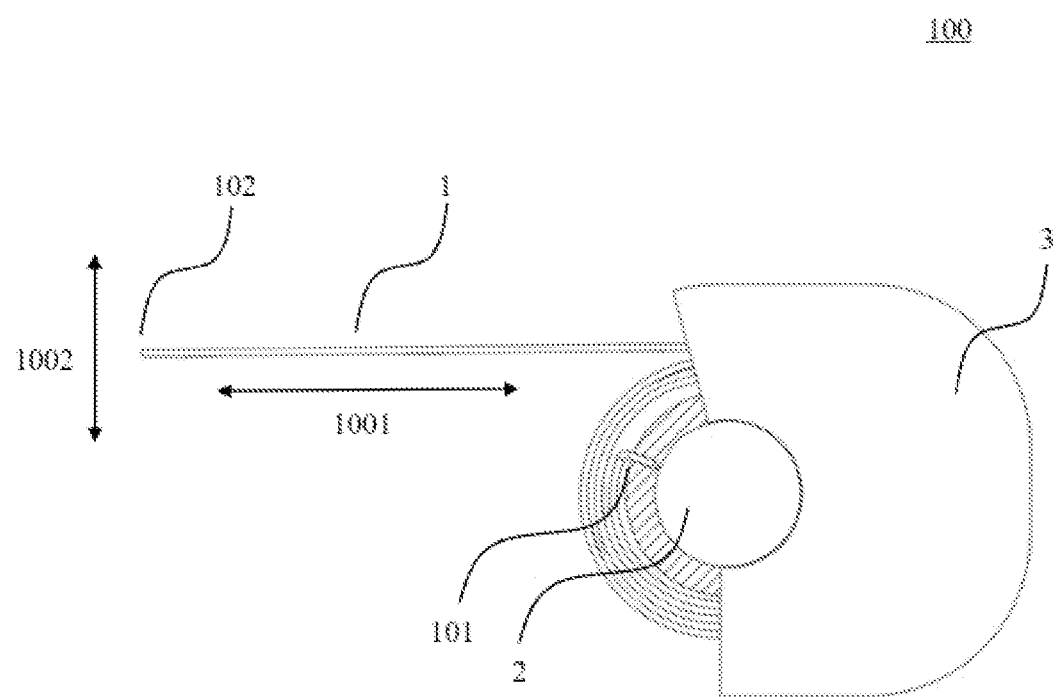
FIG. 1 is an assembled structural view of a flexible display device shown according to some embodiments of the application.

Exemplary embodiments or implementations will be described in detail herein, and the examples thereof are represented in the accompanying drawings. When the following description involves the drawings, like numerals in different drawings refer to the same or similar elements, unless otherwise indicated. The implementations described in the following exemplary embodiments do not represent all the embodiments consistent with the application. Rather, they are merely examples of apparatuses and methods consistent with some aspects of the application, as detailed in the appended claims.

The terms used in the application are only for the purpose of describing specific embodiments and is not intended to limit the application. "a", "said" and "the" used in a singular form in the application and the appended claims are also intended to encompass a plural form unless the context clearly indicates otherwise.

It is to be understood that the terms "first", "second" and the like used in the description and claims do not represent any order, quantity or importance, but merely serve to distinguish between different components. Also, the term "a" or "an" or the like do not represent a quantitative limit, but represent that there is at least one. Unless otherwise specified, the terms such as "front", "rear", "lower" and/or "upper" are only for convenience of explanation and are not limited to a location or a spatial orientation. The terms such as "comprise" or "include" means that the elements or items preceding the "comprise" or "include" encompass the elements or items listed after the "comprise" or "include" and their equivalents, and other elements or items are not excluded.

A flexible display device of one or more embodiments of the application is applicable to display systems of different electronic products. The different electronic products may include, but are not limited to, cellphones, personal computers, keyboards, displayers, televisions, vehicle-mounted display terminals, e-books, and the like. The flexible display device of the embodiments of the application can be unfolded when it is needed and retracted by curling when it is not needed, in order to save space. As an example, the flexible display device of the embodiments of the application may be applied to a television as a display screen of the television. When the television is turned off or is not required to display pictures, the display screen of the television can be curled up to save space; when the television is turned on or is required to display pictures, the display screen of the television can be unfolded into a flat screen. As yet another example, the flexible display device of the embodiments of the application may be used as a separate display accessory, i.e., the flexible display device may be connected to various terminal devices (e.g., a cellphone, a personal computer and the like) to be used as an external display device thereof. When the terminal device is required to perform unfolded display, the flexible display device can be unfolded and connected to the terminal device for displaying; when the terminal device is not required to perform unfolded display, the flexible display device can be curled up for easy portability. As yet another example, the flexible display device of the embodiments of the application may be used for displaying at an outdoor temporary activity site or displaying of promotional announcements or the like. A user may wind and store the flexible display device, carry it to the destination, and then unfold it for displaying. Flexible display devices of different widths can be selected according to the needs of the scene. After the flexible display device is connected to the signal terminal device, the information of the terminal device can be projected and amplified by the flexible display device. When the activity is over or the site is changed, the flexible display device can be curled up and carried, which is especially suitable for public touring activities.

As shown in FIG. 1, a flexible display device 100 may include a display screen body 1, a rotation shaft 2, and a housing 3. In some embodiments, the rotation shaft 2 is connected to the display screen body 1, and the display screen body 1 may be curled up on the rotation shaft 2 when the flexible display device 100 is not required to display. In some embodiments, when the flexible display screen 100 is required to display, the display screen body 1 may be detached from the rotation shaft 2 and unfolded. In some embodiments, a connection of the rotation shaft 2 to the display screen body 1 may be a fixed connection or a detachable connection. In some embodiments, the type of the fixed connection may include, but is not limited to, integral molding, adhering, pinning and the like. In some embodiments, the type of the detachable connection may include, but is not limited to, snapping, plugging connection and the like.

Figure 2A:
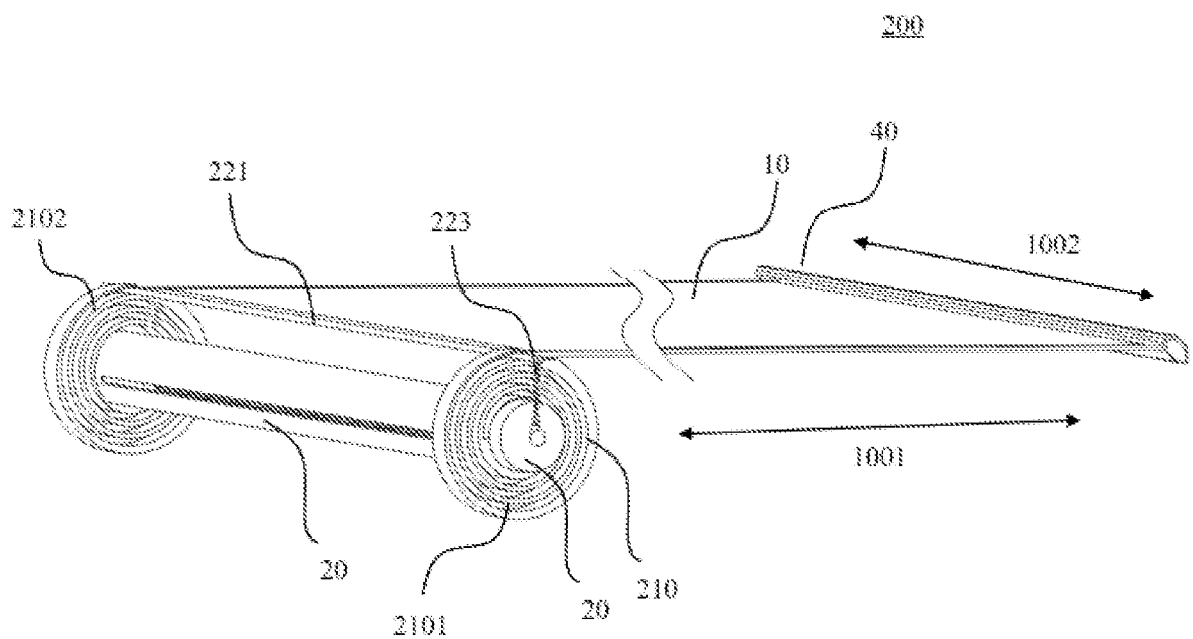
FIG. 2A is a schematic structural view of a flexible display device in an unfolded state shown according to some embodiments of the application.

In some embodiments, the housing 3 may be used to receive the curled display screen body 1. In some embodiments, the rotation shaft 2 may be disposed inside the housing 3 and connected to a starting end 101 of the display screen body 1. In some embodiments, the starting end 101 of the display screen body 1 may be interpreted as a side end closest to the rotation shaft 2 when the display screen body 1 is curled. The starting end 101 is parallel to a second direction 1002 (as shown in FIG. 2A). In some embodiments, the second direction 1002 may be a direction perpendicular to the curling direction of the display screen body 1. In some embodiments, the curling direction of the display screen body 1 may be a first direction 1001. In some embodiments, the other side end on the display screen body 1 parallel to the second direction 1002 may be a tail end 102. In some embodiments, the tail end 102 may include auxiliary structures other than the display screen body 10. The auxiliary structures can provide a function of supporting, protection and the like. In some embodiments, two sides on the display screen body 1 parallel to the first direction 1001 are a first side and a second side, respectively. In some embodiments, when the display screen body 1 of the flexible display device 100 is required to curl up, a rotation of the rotation shaft 2 can drive the display screen body 1 to be gradually wound onto the rotation shaft 2.

In some embodiments, the rotation shaft 2 may further include a drive device for driving the rotation shaft 20 to perform a winding operation. In some embodiments, the drive device may include, but is not limit to, a spring drive mechanism, a motor drive mechanism, a ratchet drive mechanism and a gear drive mechanism. In some embodiments, the drive device may be disposed inside the housing 3 in order to enhance an aesthetic appearance of the entire flexible display device. In some embodiments, the drive device may further include a user control module disposed inside a storage device. The user control module can collect control instructions of a user and transmit the control instructions to the drive device. The user control module may collect the control instructions of the user in a contactless manner. In some embodiments, a type of the user control module may be gesture recognition module, voice control module and the like. Taking the voice control module as an example, the drive device collects a voice control instruction of a user of the flexible display device through the voice control module, and controls the rotation shaft 2 to rotate according to the content of the voice control instruction, in order to enable storage or unfolding of the flexible display device. In some embodiments, the drive device may also be a torsion spring disposed on the storage device. The torsion spring is torsionally deformed and stores elastic potential energy when the display screen body 1 is unfolded, and the display screen body 1 is required to be wound up, the torsion spring can drive the rotation shaft 2 by releasing the elastic potential energy to wind the display screen body 1 up.

In some embodiments, the flexible display device 100 may further include a handle for pulling the display screen body 1 for unfolding. In some embodiments, the handle may be connected to the tail end 102 of the display screen body. In some embodiments, a connection of the handle to the end 102 may be a fixed connection or a detachable connection. In some embodiments, the type of the fixed connection may include, but is not limited to, adhering, riveting, hot press molding and the like. In some embodiments, the type of the detachable connection may include, but is not limited to, a slot connection, a snapping connection and the like. In some embodiments, a length of the handle in the second direction 1002 may be equal to a length of the housing 3 in the second direction. In some embodiments, when the rotation shaft 2 is located within the housing 3 and the display screen body 1 is completely wrapped around the rotation shaft 2, the handle may be detachably connected to the housing 3, and the tail end 102 of the display screen body 1 is fixed relative to the housing 3, so that the display screen body 1 is locked in the housing 2.

In some embodiments, the display screen body 1 may also be used to provide a touch control function. In some embodiments, a user of the flexible display device may operate a picture displayed by the display screen body 1 by touching on the display screen body 1. In some embodiments, the type of a display part used for displaying pictures in the display screen body 1 may include, but is not limited to: organic light-emitting diode (OLED), liquid crystal display (LCD), Micro LED, Mini LED and the like.

Some embodiments of the application propose a functional auxiliary structure applicable to a flexible display device, in order to solve the abrasion problem of a screen panel of the flexible display device. In some embodiments, the functional auxiliary structure may include a structure capable of isolating the screen bodies from each other when the flexible display device is in a curled state, so that there is no direct contact between the display screen bodies. In some embodiments, the functional auxiliary structure may include a support structure to provide support for the screen body when the flexible display screen is unfolded, such that the flexible display screen in an unfolded state may keep the screen body flat.

Figure 2B:
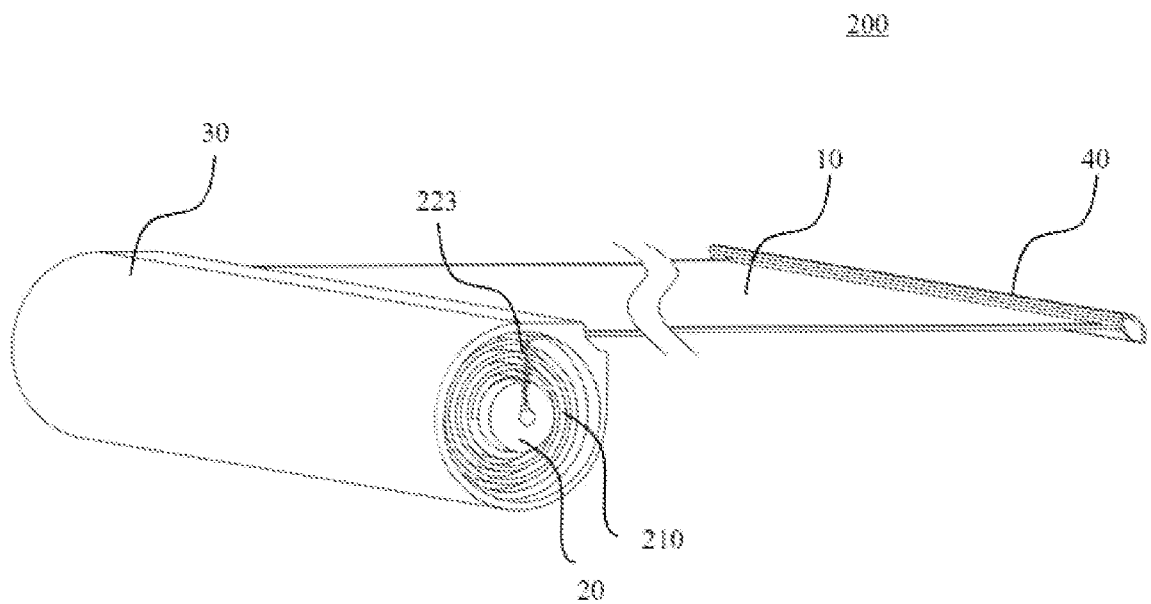
FIG. 2B is a schematic structural view of a flexible display device in an unfolded state shown according to another embodiment of the application.

Referring to FIGS. 2a and 2B, in some further embodiments of the application, the flexible display device 200 may include a display screen body 10 and a functional auxiliary structure. In some embodiments, the functional auxiliary structure can be connected to the display screen body 10 to provide curl isolation and/or unfold support for the display screen body. Herein the curl isolation indicates providing isolation for the display screen body in the curled state, and the unfold support indicates providing support for the display screen body in the unfolded state.

In some embodiments, the functional auxiliary structure may include an isolation component, and at least a part of the display screen body 10 in the curled state is isolated by the isolation component. The isolation may be the case that there is an intermediate member, such as an isolation membrane, an isolation block and the like, between the isolated parts, or that a certain space interval is ensured between the isolated parts achieved by an auxiliary structure without direct contact. In some embodiments, the at least a part of the display screen body is isolated by the isolation component may be interpreted to indicate that the isolation component may isolate the display screen body 10 continuously and completely, or may isolate the display screen body 10 discretely. For example, the isolation component may be attached to the entire back surface of the display screen body 10 and completely isolate the inner and outer turns of the display screen body 10 when the display screen body 10 is curled. For example again, the isolation component may be a plurality of isolation blocks distributed in the region of the back surface portion of the display screen body 10, and the isolation blocks are distributed at a plurality of positions between the inner and outer turns of the display screen body 10 to isolate the same. In some embodiments, the solution of the isolation component may include, but is not limited to, a spiral groove structure, a bordure structure, and spraying a liquid to form a isolation membrane and the like.

In some embodiments, the functional auxiliary structure may include a support component. The support component may provide support, via cooperation of a support member and the display screen body 10, for the display screen body 10 when the display screen body 10 of the flexible display device 200 is in the unfolded state. In some embodiments, the support member may include, but is not limited to, a bordure, a support membrane and the like. In some embodiments, the support member may also be separated from the display screen body 10 of the flexible display device 200 when the display screen body 10 is in the curled state, in order to avoid generating additional stress to the display screen body 10 when being curled.

Herein, the isolation membrane and/or the support membrane may be solid, cured or semi-cured liquid, or gel. In some embodiments, the isolation membrane and/or the support membrane may be a membrane layer formed by curing a liquid. In some embodiments, the membrane layer may provide an isolation function in the curled state, and at least partial isolation of the display screen bodies from each other is achieved when the display screen body is being curled and/or is in the curled state. The membrane layer can provide a support function in the unfolded state, and provide support for the display screen body when the display screen body is in the unfolded state, so as to help the display screen body to keep flat.

In some embodiments, the functional auxiliary structure may be selectively connected to the display screen body 10 according to the requirements of different scenes. For example, when the display screen body 10 is required to curl up and be stored after the display operation thereof is completed, in order to reduce the abrasion generated in the storage process, the display screen body 10 may be placed in a storage box with the isolation component. When the display screen body 10 is to be unfolded, a support component may engage with the display screen body 10 to provide support for the screen body. In some embodiments, if there is any other abrasion-resistant isolation component when the screen body 10 is required to be stored, the support component may be separated from the display screen body 10; if there is no other abrasion-resistant isolation component, the support component may be retained, or a part of the support component may be retained, within limits, in contact with the display screen body to reduce abrasion of the screen body during curling.

In some embodiments, referring to FIGS. 2A and 2B, the isolation component may include a spiral groove 210. The spiral groove 210 is spirally distributed about its central axis on an end surface at an angle to the second direction 1002. In some embodiments, the spiral groove is at a substantially right angle to the second direction. In some embodiments, when the display screen body 10 is being curled, the starting end of the display screen body 10 may bring the entire display screen body into the spiral groove. The central axis of the spiral groove 210 may be regarded as a virtual central axis of the display screen body 10, and the display screen body moves around the virtual central axis after entering the spiral groove, so as to be curled into or removed from the spiral groove. In some embodiments, a maximum spiral radius of the spiral groove 210 may be set as required. In some embodiments, the spiral groove 210 can accommodate at least 60% or more of the display screen body 10. In some embodiments, the spiral groove 210 can accommodate at least 80% or more of the display screen body 10. In some embodiments, the spiral groove 210 can accommodate the entire display screen body 10. In some embodiments, the spiral groove 210 can accommodate at least the entire display screen body 10 and the auxiliary structure of the tail end 102. In some embodiments, the spiral groove 210 may be two or more spiral grooves concentrically arranged and separated from each other. Without loss of generality, FIG. 2A is a structure including a first spiral groove 2101 and a second spiral groove 2102. The starting end 101 of the display screen body 10 enters the first spiral groove 2101 and the second spiral groove 2102 respectively so as to drive the display screen body 10 along the first spiral groove 2101 and the second spiral groove 2102. The first spiral groove 2101 and the second spiral groove 2102 may be concentric with each other, that is, the central axes of the first spiral groove 2101 and the second spiral groove 2102 are substantially coincide. The starting end of the display screen body 10 enters the first spiral groove 2101 and the second spiral groove 2102 respectively so as to drive the display screen body 10 to roll up along the first spiral groove 2101 and the second spiral groove 2102. In order to achieve consistency of the display screen body 10 during curling or unfolding, in some embodiments, the groove body of the first spiral groove 2101 and the groove body of the second spiral groove 2102 may have an identical groove body parametric size (e.g., the width of the groove body space, the wall thickness of the groove body, the angle at the exit of the groove body and the like). In some embodiments, the first spiral groove 2101 and the second spiral groove 2102 are identical in shape and in each parametric size, and the first spiral groove 2101 can be completely coincident with the second spiral groove 2102 along the central axis. In some embodiments, the groove body parametric sizes of the first spiral groove and the second spiral groove may also have a difference within an acceptable range, and it is necessary to only ensure that the display screen body 10 can move synchronously in the first spiral groove 2101 and the second spiral groove 2102. In some embodiments, when the spiral groove 210 includes a first spiral groove 2101 and a second spiral groove 2102, the first spiral groove 2101 corresponds to a first end of the starting end of the display screen body 10, and the second spiral groove 2102 corresponds to a second end of the starting end of the display screen body 10. Herein at least one of the first end and the second end of the starting end may be located within the corresponding spiral groove, or may extend out of the corresponding spiral groove.

In some embodiments, a length of the spiral groove 210 in a shaft center may be set as required. For example, only a part of the display screen body 10 can enter the spiral groove 210, and for another example, the entire display screen body 10 can enter the spiral groove 210. In some embodiments, a ratio of a length of the spiral groove 210 in an axial direction to a length of the display screen body 10 in the second direction 1002 is 0.5-1.2; in some embodiments, said ratio may be 0.5-1.1; in some embodiments, said ratio may be 0.5-1; in some embodiments, said ratio may be 0.6-1.1; in some embodiments, said ratio may be 0.6-1; in some embodiments, said ratio may be 0.7-1; in some embodiments, said ratio may be 0.8-1; in some embodiments, said ratio may be 1.

The length of the spiral groove in the axial direction may be flexibly designed based on the length of the display screen body 10 in the second direction 1002 and the physical property thereof. The length of the spiral groove in the axial direction may be less than the length of the display screen body 10 in the second direction 1002, so as to facilitate construction of the spiral groove and provide effective support for the display screen body 10. The length of the spiral groove in the axial direction may be greater than the length of the display screen body 10 in the second direction 1002 based on the design requirements. In some embodiments, the ratio of the length of the spiral groove 210 in the axial direction to the length of the display screen body 10 in the second direction 1002 is 0.5-1.5; in some embodiments, said ratio may be 0.5-1.1; in some embodiments, said ratio may be 0.5-1; in some embodiments, said ratio may be 0.6-1.1; in some embodiments, said ratio may be 0.6-1; in some embodiments, said ratio may be 0.7-1; in some embodiments, said ratio may be 0.8-1; in some embodiments, said ratio may be 1.

Referring to FIG. 2B, in some embodiments, the isolation component includes only a single spiral groove 210, and the spiral groove 210 can correspond to a middle portion of the display screen body 10 in the second direction 1002. Specifically, the middle portion of the starting end 101 of the display screen body 10 enters the spiral groove and drives the entire display screen body into the spiral groove, and the starting end 101 extends beyond the opposite sides of the spiral groove by a substantially identical length. In some embodiments, the middle portion of the starting end 101 of the display screen body 10 enters the spiral groove 210, that is, the spiral groove 210 are located substantially in the middle region of the starting end thereof. Herein the middle portion of the starting end can be interpreted as a portion formed by extending a certain length from a middle position in the second direction of the starting end 101 toward both sides. In some embodiments, a ratio of a length of the middle portion in the second direction to a length of the starting end in the second direction may be any numerical value between 1:5 and 1:3; in some embodiments, said ratio may also be any numerical value between 1:4 and 1:3. For example, said ratio may be 1:5 or 1:3.

In some embodiments, the flexible display device 200 may or may not include a rotation shaft. When the flexible display device 200 does not include the rotation shaft, that is, the flexible display device 200 may include the display screen body 10 and the spiral groove 210. In this scenario, the display screen body 10 may spirally enter or disengage from the spiral groove as required. In particular, when the display screen body 10 is used for displaying, the display screen body 10 may disengage from the spiral groove 210 and display pictures separately outside the spiral groove 210. When the display screen body 10 is not required to display, the display screen body 10 may be curled into the spiral groove 210 along the groove body space of the groove body 210 for storage. It should be noted that the spiral groove 210 may be required to have a sufficient degree of lubrication now so that the display screen body 10 can smoothly enter the spiral groove 210.

In some embodiments, when the flexible display device 200 includes the rotation shaft 20, the spiral groove 210 may be encircled on the rotation shaft 20, or may be disposed not on the rotation shaft 20 but outside the end of the rotation shaft 20, where it is only necessary to ensure that the spiral groove 210 is disposed coaxially with the rotation shaft 20, that is, the central axis of the spiral groove 210 is substantially coincident with the axis of the rotation shaft 20. In some embodiments, the groove body of the spiral groove 210 is spirally distributed around the axis of the rotation shaft 20 in a plane perpendicular to the rotation shaft 20.

Figure 3A:
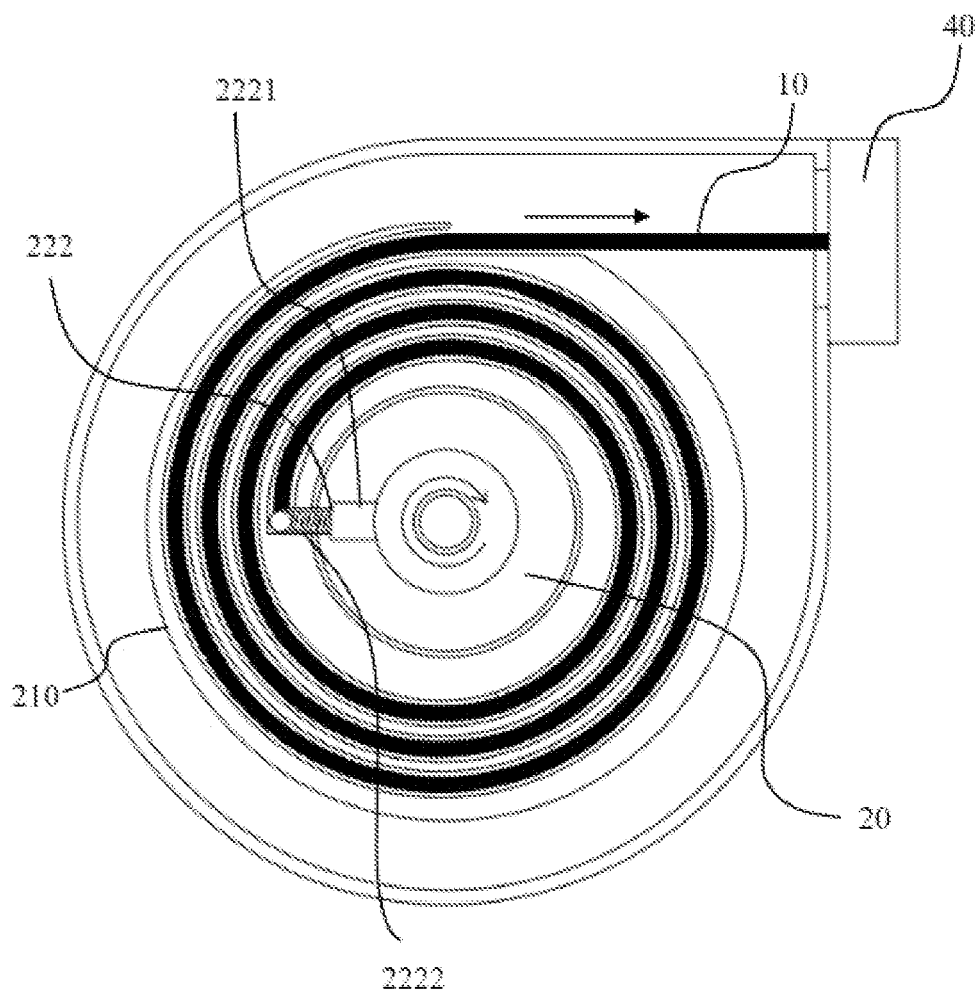
FIG. 3A is a schematic view of a flexible display device unfolded starting from a curled state shown according to some embodiments of the application.
Figure 3B:
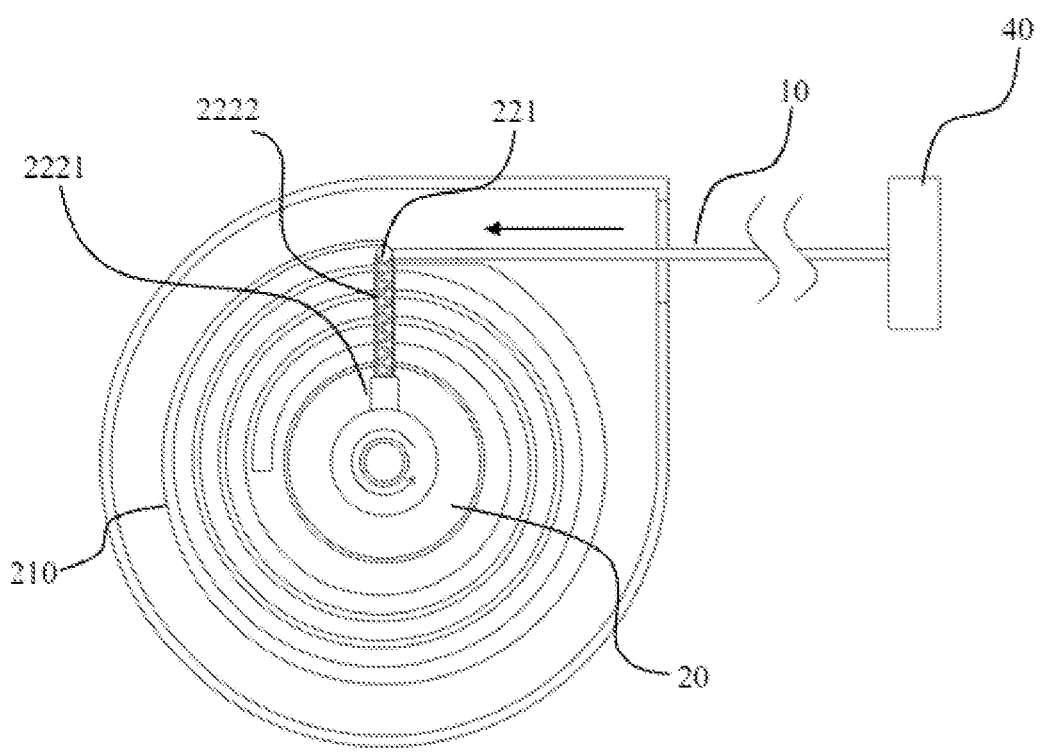
FIG. 3B is a schematic view of a flexible display device curled starting from an unfolded state shown according to some embodiments of the application.

In some embodiments, further referring to FIGS. 3A and 3B, the spiral groove 210 may be encircled on the rotation shaft 20, and the innermost turn of the spiral groove 201 may be connected to the outer circumferential surface of the rotation shaft 20. Here the connection may be a fixed connection or a detachable connection. In some embodiments, the type of the fixed connection may include, but is not limited to, integral molding, adhering, riveting, hot press molding and the like. In some embodiments, the type of the detachable connection may include, but is not limited to, snapping connection, threaded connection, magnetic attraction and the like.

Figure 4:
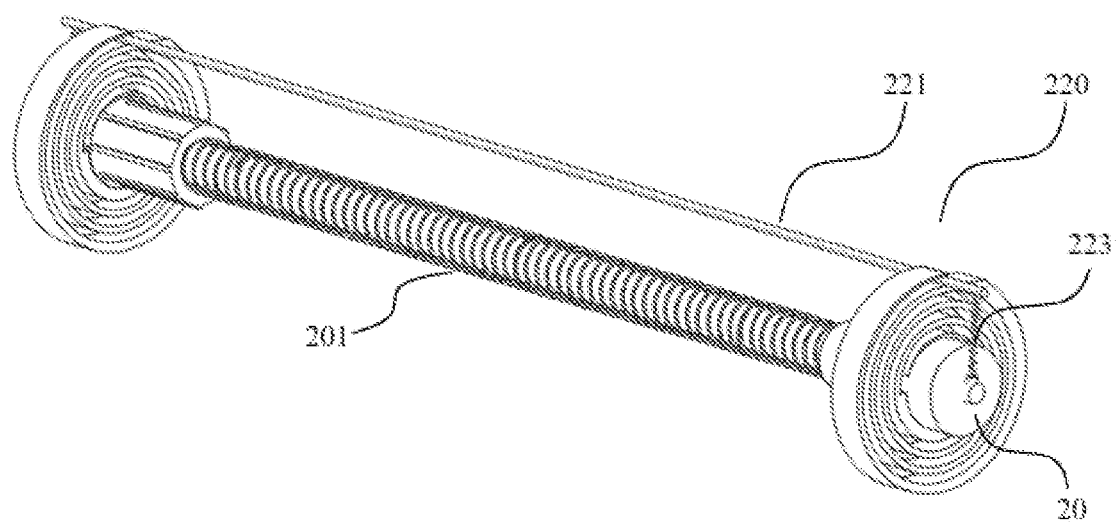
FIG. 4 is a schematic structural view of a draw device shown according to some embodiments of the application.
Figure 5A:
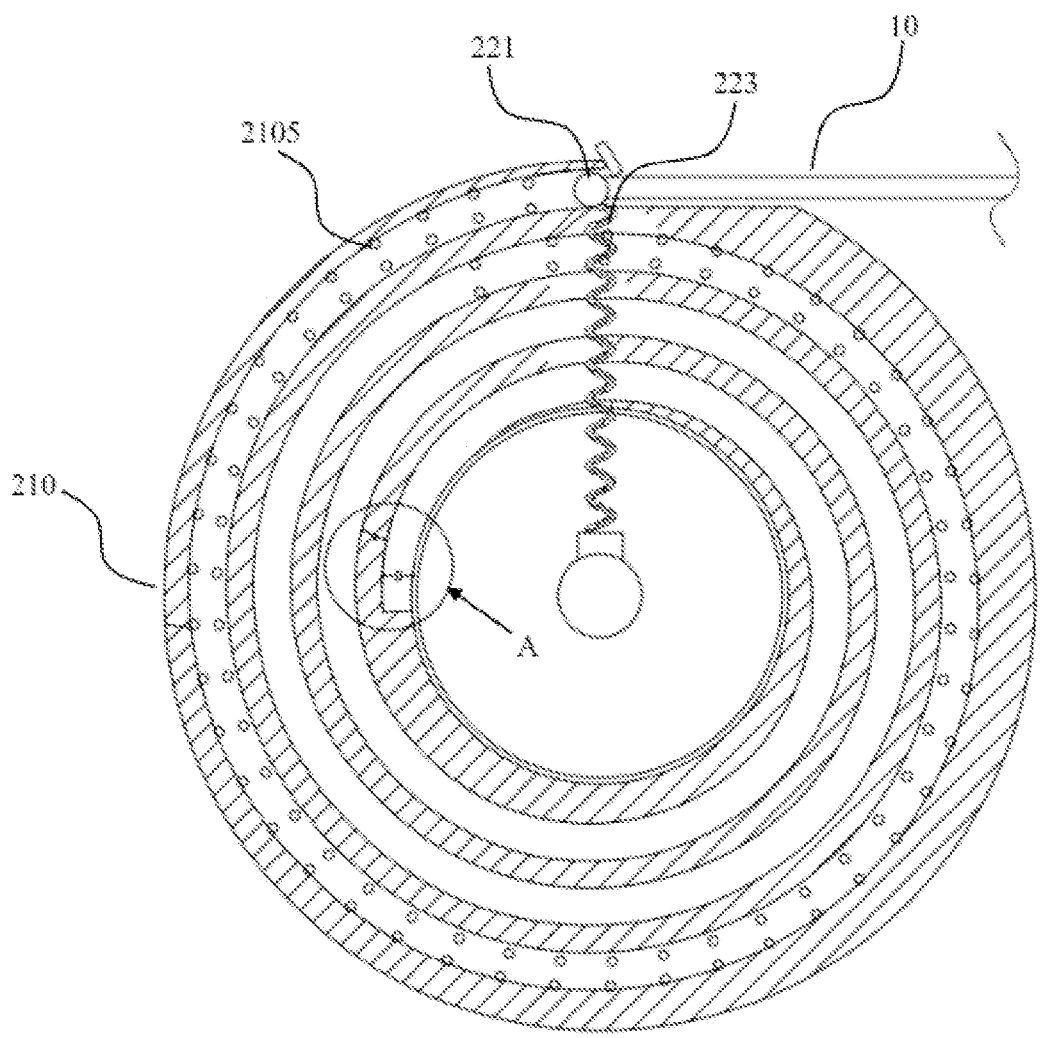
FIG. 5A is a schematic structural view of a spiral groove shown according to some embodiments of the application.

Referring to FIGS. 4 and 5A, in some embodiments, a draw device 220 may be provided in order to enable the display screen body 10 to be smoothly curled into or pulled out of the spiral groove 210. The draw device 220 can be connected to the starting end of the display screen body 10. The draw device driving the display screen body 10 to move in the spiral groove 210 can achieve unfolding or curling of the display screen body 10.

In some embodiments, the draw device 220 may include a draw bar 221. In some embodiments, the draw bar 221 is connected to the starting end 101 of the display screen body 10 and may move (e.g., slide or roll) along the groove body in the spiral groove 210, so as to drive the display screen body 10 to be curled into the spiral groove 210. In some embodiments, the connection of the draw bar 221 to the display screen body 10 may be a fixed connection. In some embodiments, the type of the fixed connection may include, but is not limited to, adhering, hot press molding, riveting and the like. In some embodiments, the connection of the draw bar 221 to the display screen body 10 may also be a detachable connection. In some embodiments, the type of the detachable connection may include snapping connection, magnetic attraction and the like.

In some embodiments, the draw bar 221 may be connected to the entire starting end of the display screen body 10 in the second direction 1002. In some embodiments, the draw bar 221 may be disposed only at two ends of the starting end of the display screen body 10. Specifically, in some embodiments, the draw bar 221 includes a first draw bar and a second draw bar disposed respectively at two ends of the starting end of the display screen body 10. Preferably, the draw bar 221 is connected to the entire starting end of the display screen body 10 so as to increase stability of the draw bar 221 during winding.

In some embodiments, the flexible display device includes a rotation shaft 20, and the draw device 220 may further include a connection structure. The rotation shaft 20 may be connected to the draw bar 221 via the connection structure to transmit the rotation of the rotation shaft 20 to the draw bar 221, such that the draw bar 221 can rotate together with the rotation shaft 20. Now the connection structure is required to have a telescopic capacity in a radial direction of the spiral groove 210, so that the connection structure can have a corresponding length when the draw bar 221 is in different radial (or number of turn) positions in the spiral groove 210, in order to avoid a structural interference to impede movement of the draw bar 221. In some embodiments, the connection structure may be a resilient lever structure, a spring structure deformable in a length direction, or a combination of the both.

In some embodiments, referring to FIGS. 3A and 3B, the connection structure may include a resilient lever 222 to connect the draw bar 221 to the rotation shaft 20, such that the draw bar 221 may rotate together with the rotation shaft 20. In some embodiments, one end of the resilient lever 222 is fixedly connected to the rotation shaft 20 and the other end is fixedly connected to the draw bar 221. In some embodiments, the resilient lever 222 may vary in length with different positions of the draw bar 221 in the spiral groove 210. In some embodiments, the length of the resilient lever 222 may range from 1 mm to 200 mm; in some embodiments, the length of the resilient lever 222 may range from 1 mm to 180 mm; in some embodiments, the length of the resilient lever 222 may range from 1 mm to 150 mm; in some embodiments, the length of the resilient lever 222 may range from 1 mm to 100 mm; in some embodiments, the length of the resilient lever 222 may range from 1 mm to 80 mm; in some embodiments, the length of the resilient lever 222 may range from 1 mm to 60 mm; in some embodiments, the length of the resilient lever 222 may range from 1 mm to 50 mm; in some embodiments, the length of the resilient lever 222 may range from 1 mm to 20 mm; in some embodiments, the length of the resilient lever 222 may range from 1 mm to 10 mm; in some embodiments, the length of the resilient lever 222 may range from 1 mm to 5 mm; in some embodiments, the length of the resilient lever 222 may range from 1 mm to 3 mm. In some embodiments, the resilient lever 222 may be formed by connecting at least two sections to achieve the telescoping function.

In some embodiments, further referring to FIGS. 3A and 3B, the resilient lever 222 may include a first sleeve 2221 and a second sleeve 2222 slidable relative to each other. In some embodiments, the first sleeve 2221 and the second sleeve 2222 have different outer diameters and inner diameters. In some embodiments, the inner diameter of the first sleeve 2221 may be greater than the outer diameter of the second sleeve 2222, and the second sleeve 2222 may be enclosed in the first sleeve 2221 and may slide axially therein. It should be noted that the sizes and insertion relationship of the first sleeve 2221 and the second sleeve 2212 may be interchanged with the same function being achieved. In some embodiments, the resilient lever 222 may further include a bellows that is stretchable in the axial direction.

In some embodiments, further referring to FIG. 4, the connection structure may not include the resilient lever 222, but may include a second spring 223 for connecting the draw bar 221 to the rotation shaft 20. In some embodiments, the second spring 223 may be changed in length by tension or compression as the draw bar 221 moves in the spiral groove 210. In some embodiments, the length of the second spring 223 may range from 1 mm to 200 mm; in some embodiments, the length of the second spring 223 may range from 1 mm to 180 mm; in some embodiments, the length of the second spring 223 may range from 1 mm to 150 mm; in some embodiments, the length of the second spring 223 may range from 1 mm to 100 mm; in some embodiments, the length of the second spring 223 may range from 1 mm to 80 mm; in some embodiments, the length of the second spring 223 may range from 1 mm to 60 mm; in some embodiments, the length of the second spring 223 may range from 1 mm to 50 mm; in some embodiments, the length of the second spring 223 may range from 1 mm to 20 mm; in some embodiments, the length of the second spring 223 may range from 1 mm to 10 mm; in some embodiments, the length of the second spring 223 may range from 1 mm to 5 mm; in some embodiments, the length of the resilient lever 222 may range from 1 mm to 3 mm In some embodiments, the elastic coefficient of the second spring 223 may be 0.001 KG*F–10 KG*F; preferably, the elastic coefficient of the secondary spring 223 may be 0.001 KG*F–0.5 KG*F; more preferably, the elastic coefficient of the second spring 223 may be 0.001 KG*F–0.1 KG*F.

In some embodiments, when the draw bar 221 is located in an inner turn of the spiral groove 210 near the center of the spiral groove 210, the second spring 223 may be in an undeformed state or in a deformed state. When the draw bar 221 is located in an outer turn in the spiral groove 210 away from the center thereof, the second spring 223 is in a stretched state, and at this time, the second spring 223 may provide a second draw force for the draw bar 221 toward the center of the spiral groove 210.

In some embodiments, the connection structure may also include a resilient lever 222 and a second spring 223, as shown in FIG. 3B. In some embodiments, the second spring 223 may be disposed inside the first sleeve 2211 and the second sleeve 2212 of the resilient lever 222, and can provide a draw force for the draw bar 221 toward the center of the spiral groove 210. In this embodiment, since the second spring 223 is located inside the resilient lever 222, the deformation in the non-drawing direction of the second spring 223 can be effectively restricted, and the stability of the draw device 220 can be improved.

In some embodiments, referring to FIG. 4, the rotation shaft 20 is further encircled by a first spring 201. In some embodiments, the first spring 201 may drive the rotation shaft 20 to rotate by releasing the stored elastic potential energy, thereby driving the draw bar 221 to move in the spiral groove 210 in cooperation with the connecting structure. In some embodiments, the first spring can provide a first draw force to the rotation shaft 20 for the rotation shaft 20 in a first rotation direction, and the return force can drive the draw bar 221 to move in the spiral groove 210, thereby driving the display screen body 10 to curl up. In some embodiments, the first spring 201 may be a torsion spring. In some embodiments, the elastic coefficient of the first spring 201 may be any numerical value between 0.001 KG*F and 10 KG*F; in some embodiments, the elastic coefficient of the first spring 201 may be any numerical value between 0.005 KG*F and 10 KG*F; in some embodiments, the elastic coefficient of the first spring 201 may be any numerical value between 0.01 KG*F and 10 KG*F; in some embodiments, the elastic coefficient of the first spring 201 may be any numerical value between 0.1 KG*F and 10 KG*F; in some embodiments, the elastic coefficient of the first spring 201 may be any numerical value between 0.5 KG*F and 10 KG*F; in some embodiments, the elastic coefficient of the first spring 201 can be any numerical value between 1 KG*F and 10 KG*F.

In some embodiments, when the display screen body 10 is pulled and unfolded by an external force, the display screen body 10 during rotation may drive the rotation shaft 20 to rotate in a certain direction, so that the first spring 201 is deformed and accumulates elastic potential energy. When the external force pulling the display screen body 10 disappears, the first spring 201 may release the elastic potential energy and drive the rotation shaft 20 to rotate in the opposite direction and drive the display screen body 10 to be curled onto the rotation shaft 20.

Figure 5B:
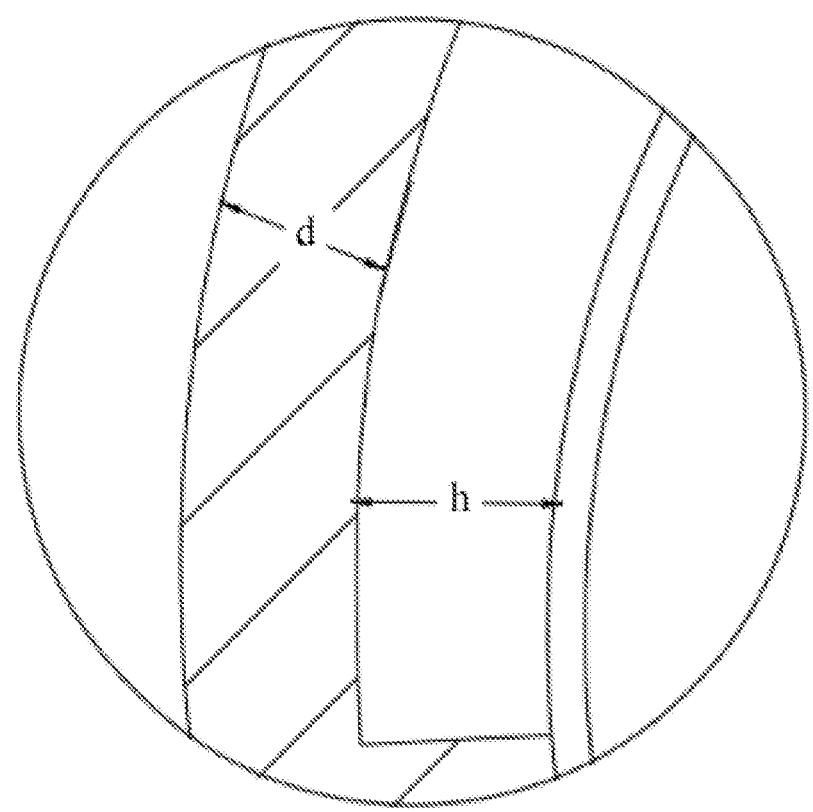
FIG. 5B is a partial enlarged view of a region A in FIG. 5A according to the application.

Referring to FIGS. 5A and 5B, a space between the inner walls of two adjacent turns of the spiral groove 210 for receiving the display screen body 10 is a groove body space, and a size of the groove body space in the radial direction is a width h of the groove body space. The size in the radial direction of the spiral groove 210 between two adjacent turns of the groove body space is a groove body wall thickness d of the spiral groove 210. In some embodiments, the width h of the groove body space is identical on inner and outer turns, and also, the width h may be different on inner and outer turns. In some embodiments, the groove body wall thickness d may be identical on inner and outer turns, and also, the groove body wall thickness d may be different on inner and outer turns. In some embodiments, the width h of the groove body space is greater than or equal to the thickness of the display screen body 10. Reference will be made to what follows for more description of the width h of the groove body space and the groove body wall thickness d.

Referring to FIGS. 5A and 5B, in some embodiments, the width h of the groove body space of the spiral groove 210 may be any numerical value between 0.1 mm and 1 mm; In some embodiments, the width h may be any numerical value between 0.1 mm and 0.9 mm; in some embodiments, the width h may be any numerical value between 0.2 mm and 0.8 mm; in some embodiments, the width h may be any numerical value between 0.3 mm and 0.9 mm; in some embodiments, the width h may be any numerical value between 0.3 mm and 0.8 mm; in some embodiments, the width h may be any numerical value between 0.4 mm and 0.9 mm; in some embodiments, the width h may be any numerical value between 0.4 mm and 0.8 mm; in some embodiments, the width h may be any numerical value between 0.5 mm and 0.9 mm; in some embodiments, the width h may be any numerical value between 0.5 mm and 0.8 mm; in some embodiments, the width h may be any numerical value between 0.6 mm and 0.9 mm; in some embodiments, the width h may be any numerical value between 0.6 mm and 0.8 mm; in some embodiments, the width h may be any numerical value between 0.6 mm and 0.7 mm. In some embodiments, in order to allow the display screen body 10 to move more smoothly in the spiral groove 210, the width h of the groove body space of the spiral groove 210 may be any numerical value between 0.5 mm and 1 mm; in some embodiments, the width h may be any numerical value between 0.6 mm and 1 mm; in some embodiments, the width h may be any numerical value between 0.7 mm and 1 mm; and in some embodiments, the width h may be any numerical value between 0.8 mm and 1 mm; in some embodiments, the width h may be any numerical value between 0.9 mm to 1 mm. In some embodiments, in order to ensure stability of movement of the display screen body 10 in the spiral groove 210, the width h of the groove body space of the spiral groove 210 may have a certain tolerance with the thickness of the display screen body 10. In some embodiments, the tolerance may be ±0.01 mm-±0.5 mm; preferably, the tolerance may be +0.02 mm-+0.2 mm; and more preferably, the tolerance may be ±0.05 mm to ±0.1 mm.

Referring to FIGS. 5A and 5B, in some embodiments, the groove body wall thickness d of the spiral groove 210 may be any numerical value between 0.1 mm and 2 mm; in some embodiments, the groove body wall thickness d may be any numerical value between 0.1 mm and 1.9 mm; in some embodiments, the groove body wall thickness d may be any numerical value between 0.2 mm and 1.8 mm; in some embodiments, the groove body wall thickness d may be any numerical value between 0.3 mm and 1.7 mm; in some embodiments, the groove body wall thickness d may be any numerical value between 0.4 mm and 1.6 mm; in some embodiments, the groove body wall thickness d may be any numerical value between 0.5 mm and 1.5 mm; in some embodiments, the groove body wall thickness d may be any numerical value between 0.6 mm and 1.4 mm; in some embodiments, the groove body wall thickness d may be any numerical value between 0.7 mm and 1.3 mm; in some embodiments, the groove body wall thickness d may be any numerical value between 0.8 mm and 1.2 mm. In some embodiments, in order to save the space occupied by the spiral groove 210, the groove body wall thickness d may be any numerical value between 0.1 mm and 1 mm; in some embodiments, the groove body wall thickness d may be any numerical value between 0.1 mm and 0.9 mm; in some embodiments, the groove body wall thickness d may be any numerical value between 0.1 mm and 0.8 mm; in some embodiments, the groove body wall thickness d may be any numerical value between 0.1 mm and 0.7 mm; in some embodiments, the groove body wall thickness d may be any numerical value between 0.1 mm and 0.6 mm; in some embodiments, the groove body wall thickness d may be any numerical value between 0.1 mm and 0.5 mm; in some embodiments, the groove body wall thickness d may be any numerical value between 0.2 mm and 0.8 mm; in some embodiments, the groove body wall thickness d may be any numerical value between 0.2 mm and 0.6 mm; in some embodiments, the groove body wall thickness d may be any numerical value between 0.3 mm and 0.9 mm; in some embodiments, the groove body wall thickness d may be any numerical value between 0.3 mm and 0.8 mm; in some embodiments, the groove body wall thickness d may be any numerical value between 0.4 mm and 0.8 mm; in some embodiments, the groove body wall thickness d may be any numerical value between 0.5 mm and 0.9 mm. In some embodiments, in order to facilitate machining of the spiral groove 210 and reduce production difficulty, the groove body wall thickness d may be any numerical value between 1 mm and 2 mm; in some embodiments, the groove body wall thickness d may be any numerical value between 1.2 mm and 1.8 mm; in some embodiments, the groove body wall thickness d may be any numerical value between 1.2 mm and 1.6 mm; in some embodiments, the groove body wall thickness d may be any numerical value between 1.2 mm and 1.5 mm; in some embodiments, the groove body wall thickness d may be any numerical value between 1.3 mm and 1.7 mm; in some embodiments, the groove body wall thickness d may be any numerical value between 1.2 mm and 1.8 mm; in some embodiments, the groove body wall thickness d may be any numerical value between 1.4 mm and 1.8 mm; in some embodiments, the groove body wall thickness d may be any numerical value between 1.5 mm and 2 mm; in some embodiments, the groove body wall thickness d may be any numerical value between 1.5 mm and 1.8 mm.

In some embodiments, the minimum diameter of the spiral groove 210 may be any numerical value between 1 mm and 40 mm; in some embodiments, the minimum diameter may be any numerical value between 1 mm and 30 mm; in some embodiments, the minimum diameter may be any numerical value between 1 mm and 20 mm; in some embodiments, the minimum diameter may be any numerical value between 1 mm and 10 mm; in some embodiments, the minimum diameter may be any numerical value between 2 mm and 9 mm; in some embodiments, the minimum diameter may be any numerical value between 3 mm and 8 mm; in some embodiments, the minimum diameter may be any numerical value between 4 mm and 7 mm; in some embodiments, the minimum diameter may be any numerical value between 5 mm and 6 mm. In some embodiments, the maximum diameter of the spiral groove 210 may be any numerical value between 50 mm and 200 mm; in other embodiments, the maximum diameter may be any numerical value between 60 mm and 190 mm; in other embodiments, the maximum diameter may be any numerical value between 50 mm and 180 mm; in other embodiments, the maximum diameter may be any numerical value between 70 mm and 150 mm; in other embodiments, the maximum diameter may be any numerical value between 80 mm and 120 mm; in other embodiments, the maximum diameter may be any numerical value between 90 mm and 100 mm Herein the minimum radius of the spiral groove may be interpreted as the minimum distance from various points on the innermost turn of the spiral groove to the center of the spiral groove. The maximum radius of the spiral groove may be interpreted as the maximum distance from various points on the outermost turn of the spiral groove to the center of the spiral groove.

Figure 6A:
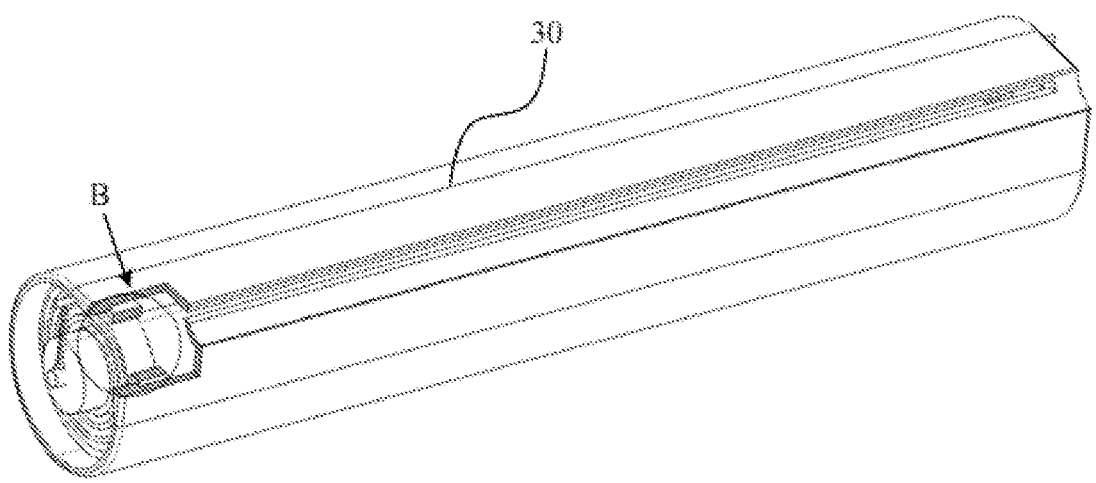
FIG. 6A is a schematic structural view of a spiral groove shown according to still further embodiments of the application.
Figure 6B:
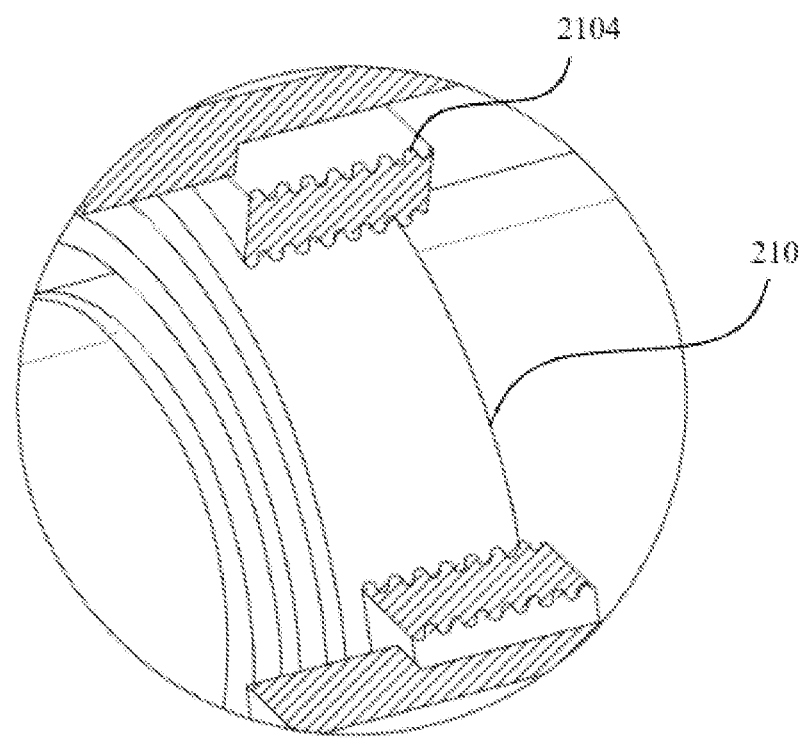
FIG. 6B is a partial enlarged view of a region B in FIG. 6A according to the application.

In some embodiments, further referring to FIGS. 6A and 6B, an inner wall of the spiral groove 210 has an undulated shape in a direction parallel to its axis, i.e., the spiral groove 210 includes an undulated arcuate shape 2104 in the interior. When the draw bar moves on the inner wall of the spiral groove 210, the undulated arcuate shape 2104 may provide an obstacle to the movement of the draw bar in the axial direction thereof, and thereby driving the draw bar to move the display screen body more smoothly. The inner wall of the spiral groove 210 may be interpreted as a groove wall contactable with the display screen body 10 or the draw bar 221 in the groove body space.

In some embodiments, the undulated shape includes, but is not limited to, a wavy shape, a crenelated shape, and a saw tooth shape. In some embodiments, the curve of the wavy shape may include, but is not limited to, a sinusoidal curve, a normal distribution curves, a parabola, a circular arc and the like. In some embodiments, the wavy curve may be a full wave curve or a half wave curve.

In some embodiments, an outer wall of the draw bar 221 has a shape matching the undulated shape of the inner wall of the spiral groove 210 in the direction of the axis thereof. In some embodiments, the type of matching may be matching of a recess and a protrusion with the same size and height. In some embodiments, the matching may limit sliding of the draw bar 221 in the groove body space of the spiral groove 210 in the direction of the axis, to increase stability of movement of the draw bar 221 in the spiral groove 210. For example, when the undulated shape of the inner wall of the spiral groove is a wavy shape, the outer wall of draw bar 221 may have a wavy shape in the axial direction thereof, and the wavy shape on the draw bar 211 and the wavy shape on the spiral groove can be in form fit.

In some embodiments, a slide auxiliary structure may also be provided in the spiral groove 210. In some embodiments, the slide auxiliary structure may be used to reduce a frictional force when the draw bar slides in the spiral groove, so as to assist the draw bar 221 in smoothly sliding in the spiral groove 210.

In some embodiments, further referring to FIG. 5A, the slide auxiliary structure may include a ball disposed on the inner wall of the spiral groove 210, and the ball 2105 is exposed in the spiral groove 210. In some embodiments, the ball 2105 can rotate freely relative to the inner wall of the spiral groove 210. In some embodiments, the draw bar 221 can contact the ball 2105 during movement. The ball 2105 may reduce the frictional force experienced by the draw bar 221 during movement in the spiral groove 210 from the inner wall of the spiral groove 210, such that the movement of the draw bar in the spiral groove is smoother.

In some embodiments, the slide auxiliary structure may also include a polished layer and/or a lubricate coating disposed on the inner wall of the spiral groove 210. In some embodiments, the polished layer and/or the lubricate coating may also reduce the frictional force experienced by the draw bar 221 during movement in the spiral groove 210 from the inner wall of the spiral groove 210, such that the movement of the draw bar 221 is smoother. In some embodiments, the polished layer may be interpreted as that the inner wall of the spiral groove 210 is subjected to a polishing process. Here the processing type of the polished layer includes, but is not limited to, mechanical polishing, chemical polishing, electrolytic polishing, ultrasonic polishing, fluid polishing, magnetic grinding polishing and the like. In some embodiments, the lubricate coating may be interpreted as a layer of material with low friction property additionally provided on the inner wall of the spiral groove 210. In some embodiments, the lubricate coating may be a metal coating or may be a non-metal coating. In some embodiments, the metal coating may include, but is not limit to, a nickel plate layer, a silver plate layer, a chromium plating layer and the like. In some embodiments, the non-metal coating may include, but is not limit to, nylon, polyoxymethylene (POM) material, polytetrafluoroethylene (PTFE) material (EPTFE) material and the like.

In some embodiments, a friction coating may also be provided on the inner wall of the spiral groove 210 to increase to some extent the frictional force between the draw bar and the inner wall of the spiral groove during movement, for the purpose of blocking movement of the draw bar 221 in the spiral groove 210 to some extent and reducing a movement speed of the draw bar 221 to make the movement thereof more stable. In some embodiments, the friction coating may include, but is not limit to, copper based high strength friction coating material, cobalt based high temperature friction coat material and the like.

In some embodiments, a wearproof coating may also be provided on the inner wall of the spiral groove 210 to reduce abrasion of the spiral groove 210 and/or the draw bar 221 during movement. In some embodiments, the material includes a nickel-chromium alloy coating, a tungsten carbide alloy coating, a ceramic coating, an alumina coating, a zirconium oxide coat, a chromium oxide coating, an epoxy coating and the like.

In some embodiments, the flexible display device is further provided with a blocking structure to prevent the draw bar 221 from accidentally slipping out of the spiral groove. In some embodiments, the blocking structure can restrict or hinder the draw bar 221 from sliding out of the spiral groove 210. In some embodiments, the restriction or hindering may be interpreted as an obstruction provided for the accidental sliding out of the draw bar 221 preventing the draw bar 221 from sliding out automatically in the event of an accident, but the draw bar 221 may still be manually taken out of the spiral groove 210.

Figure 7:
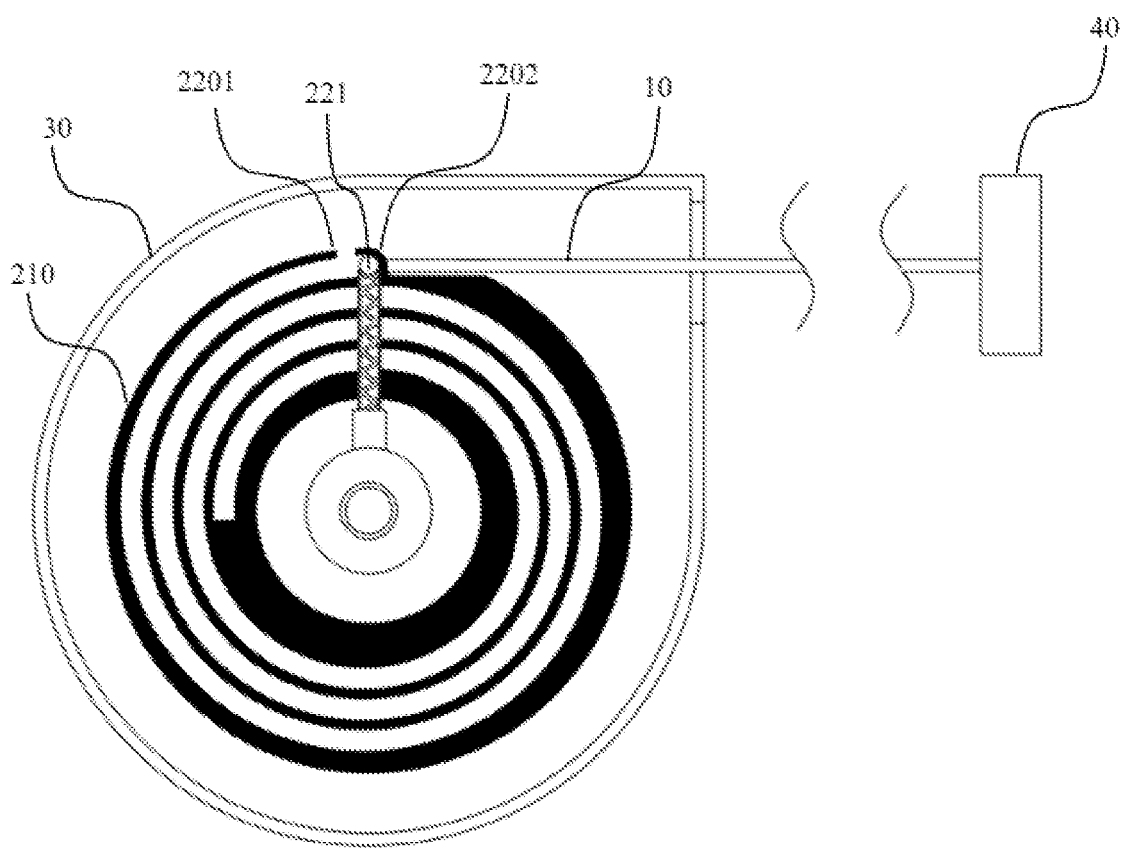
FIG. 7 is a schematic structural view of a spiral groove shown according to other embodiments of the application.

In some embodiments, further referring to FIG. 7, the blocking structure may include a first blocking member 2202 disposed at an outfall 2201 of the spiral groove 210. In some embodiments, the first blocking member 2202 can completely or partially block the outfall. In some embodiments, the first blocking member 2202 includes a stopper disposed on the inner wall of the spiral groove. As shown in FIG. 7, when the draw bar 221 moves to the outfall 2201, the stopper of the first blocking member 2202 may restrict the draw bar 221 from continuing to move out of the outfall 2201.

In some embodiments, the first blocking member 2202 may be fixedly connected to the outfall 2201, or may be detachably connected to the outfall 2201. In some embodiments, the type of the fixed connection may include, but is not limit to, integral molding, riveting, adhesion and the like. In some embodiments, the detachable connection may include, but is not limited to, snapping connection, magnetic attraction and the like.

In some embodiments, the first blocking member may include one or more protrusions disposed at the outfall 2201. The one or more protrusions results in an undulated shape of the inner wall of the spiral groove 210 at the outfall 2201 of the spiral groove 210. The undulated shape may also include a recess adjacent the one or more protrusions. Herein the protrusion and the recess are relative terms, and the one with a higher height in a direction perpendicular to the inner wall arc surface may be referred to as the protrusion, while the one with a lower height may be referred to as the recess. In some embodiments, the undulated shape formed by the one or more protrusions may be any shape including, but not limited to, a wavy shape, a serrated shape, a crenelated shape and the like. In some embodiments, the protrusion of the first blocking member 2202 may slow or stop the movement of the draw bar 221 when the draw bar 221 moves to the outfall 2201. In some embodiments, the draw bar 221 may still be manually removed from the spiral groove 210 in the undulated direction of the protrusion.

In some embodiments, the first blocking member 2202 may also be movably connected to the spiral groove 210 at the outfall 2201 of the spiral groove 210. In some embodiments, the first blocking member 2202 may move between a first position and a second position. In the first position, the first blocking member 2202 at least partially blocks the outfall 2201, and the starting end of the display screen body cannot accidentally slide out of the outfall 2201 of the spiral groove 210. In the second position, the blocking of the outfall 2201 by the first blocking member 2202 is cancelled, and the starting end of the display screen body can slide out of the outfall 2201 of the spiral groove 210. In some embodiments, when the first blocking member 2202 is located at the first position, the first blocking member 2202 may provide a limiting function for the draw bar 221, that is, to prevent or restrict the draw bar 221 from moving outward from the outfall 2201 of the spiral groove 210, so that the draw bar 221 cannot smoothly slide out of the outfall 2201. When the first blocking member 2202 is located at the second position, the first blocking member 2202 respective to the draw bar 221 is out of action, the draw bar 221, when moved to the outfall 2201 by an external force, may smoothly slide out of the outfall 2201 without any obstruction.

In some embodiments, the spiral groove 210 may also include a blocking structure separate from the spiral groove 210, and the blocking structure may include a detachable cover, a tether and the like.

Specifically, in some embodiments, the blocking structure further may include covers disposed at two ends of the rotation shaft 210, and the covers cover at least a part of the outfall. When the display screen body of the flexible display device is in the curled state, the covers may engage with the spiral groove 210 located at the two ends of the display screen body 10, such that the covers can cover a part or all of the outfall 2201 of the spiral groove 210, thereby preventing the starting end of the display screen body from accidentally sliding out of the outfall 2201 of the spiral groove 210. The engagement of the cover with the spiral groove 210 may, on the one hand, protect the display screen body 10 in the curled state, in order to avoid damages due to collision of the end of the display screen body 10 with other objects, and on the other hand, prevent the draw bar from accidentally sliding out. In some embodiments, a tether may be tied to restrict the movement of the draw bar 221 to restrict the draw bars from sliding out of the outfall 2201 of the spiral groove 210. When the tether is separate from the draw bar 221, the movement restriction for the draw bar is also released.

Figure 8:
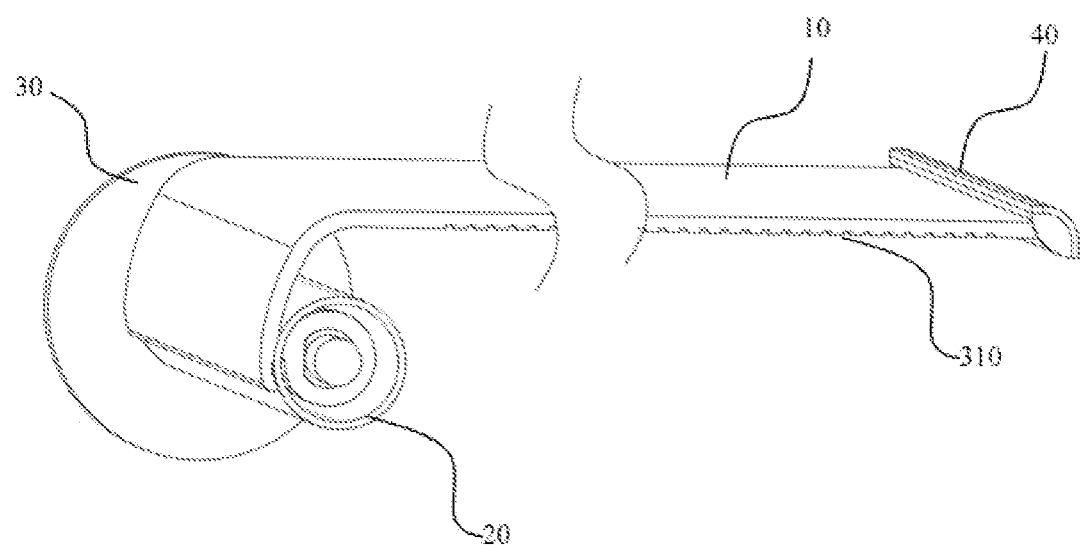
FIG. 8 is a schematic structural view of a flexible display device in an unfolded state shown according to a third embodiment of the application.
Figure 9:
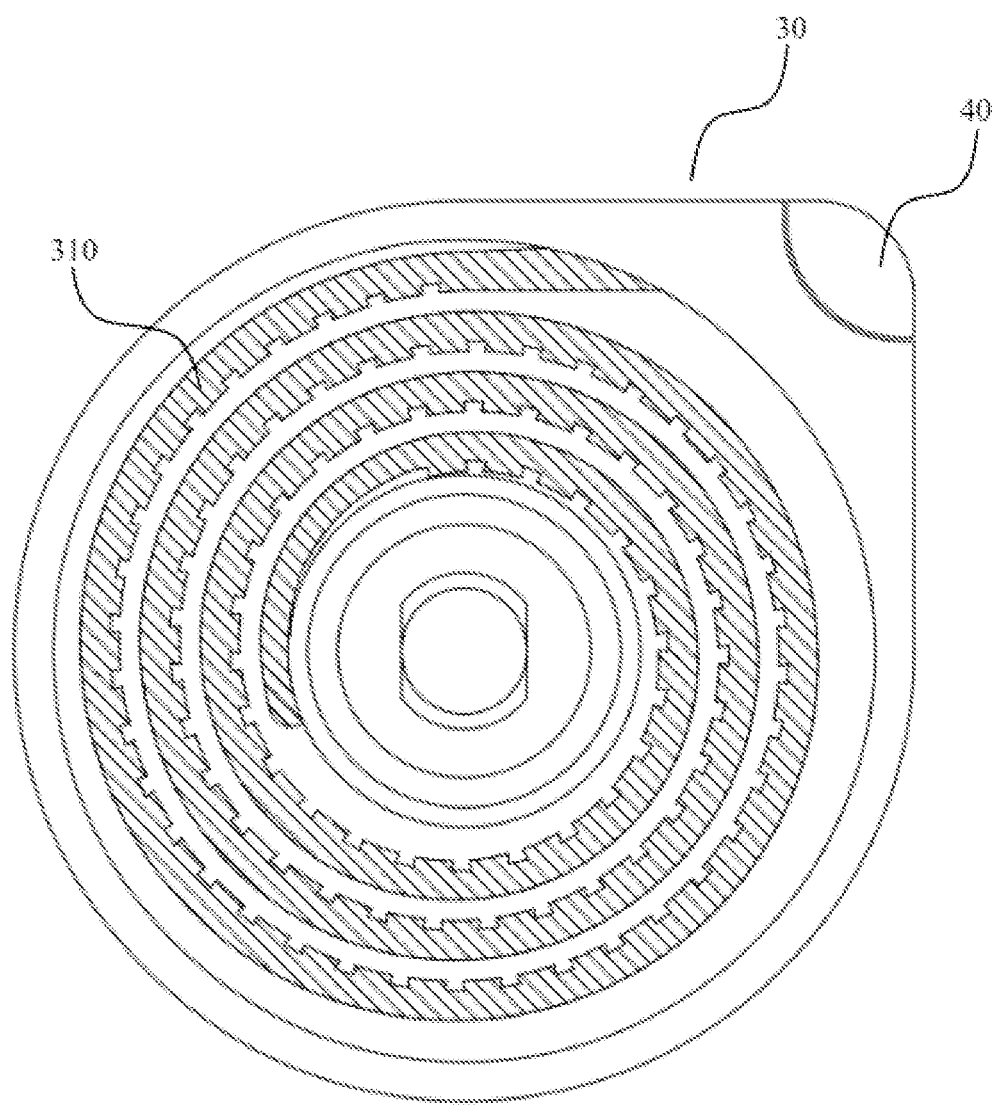
FIG. 9 is a cross-sectional view of a bordure structure shown according to some embodiments of the application.
Figure 10:
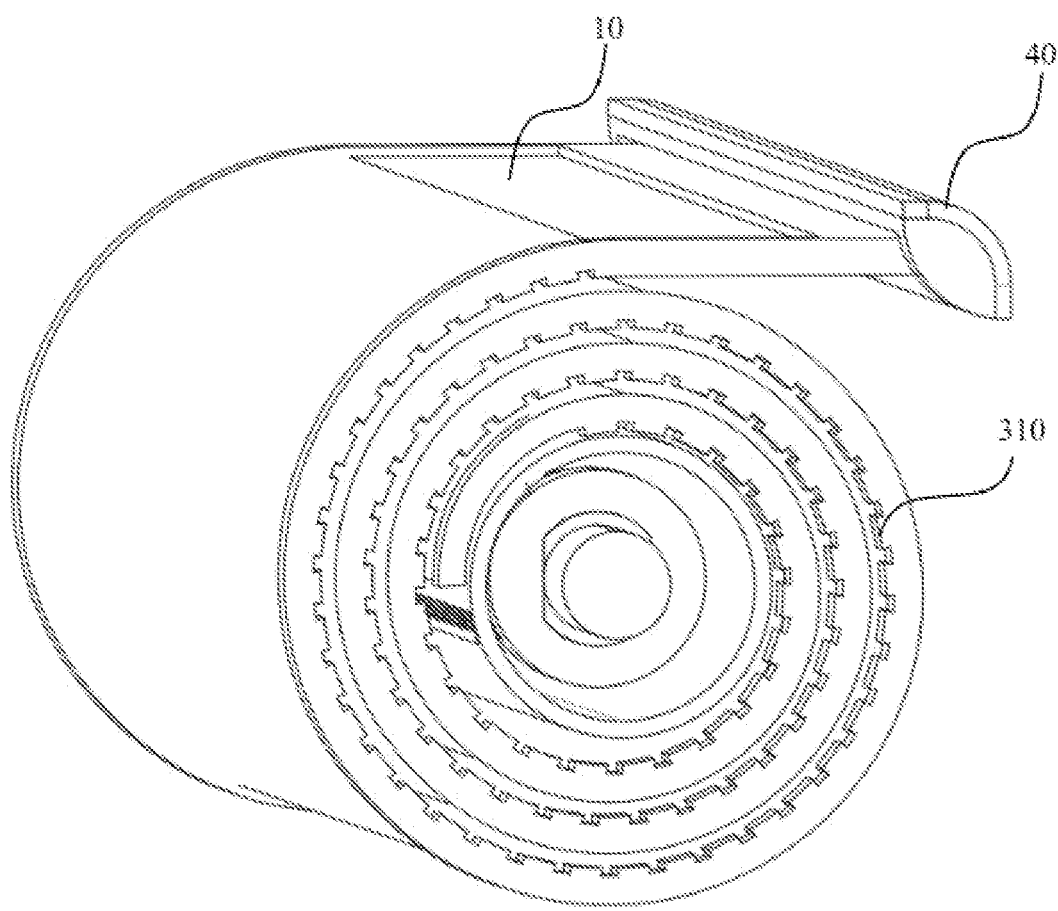
FIG. 10 is an assembled structural view of a bordure structure shown according to some embodiments of the application.

In some embodiments, further referring to FIGS. 8-10, the isolation component may also include a bordure structure which can be disposed on the display screen body 10. In some embodiments, the bordure structure may include a bordure 310. In some embodiments, the bordure 310 may be disposed on a first side and/or a second side of the display screen body 10. In some embodiments, the notches may be disposed on a front surface and/or a back surface of the display screen body 10. Here the front surface of the display screen body may be interpreted as a light emitting surface of the display screen body, and the back surface of the display screen body may be interpreted as a surface away from the light emitting surface. In some embodiments, further referring to FIGS. 11A and 11B, a width M of the bordure 310 at the front surface (displaying surface) of the display screen body 10 may be identical to a width M at the back surface (non-displaying surface). In some embodiments, further referring to FIG. 10B, the width M may be a length of the bordure 310 in the second direction. In some embodiments, the width M of the bordure 310 in the second direction 1002 may be 0.1 mm-10 mm, and preferably, may be 1 mm-8 mm, and more preferably, may be 1 mm-5 mm. In some embodiments, the width of the bordure 310 at the front surface of the display screen body 10 may also be different from the width at the back surface. In some embodiments, a region of the bordure 310 at the back surface of the display screen body 10 may have a greater width than a region at the front surface of the display screen body 10. For example, the bordure 310 may cover the entire back surface of the display screen body 10. The region of the bordure 310 at the front surface of the screen 10 may be interpreted as an upper side of the bordure 310. In some embodiments, the region of the bordure 310 at the back surface of the screen 10 may be interpreted as a lower side of the bordure 310.

In some embodiments, a material of the bordure 310 may include, but is not limited to, flexible plastic, photo-curable material, ultra-thin metal alloy, textile material and the like. In some of the embodiments, the flexible plastic may include any one or a combination of two or more of the following materials: thermoplastic polyurethane elastomer (TPU) material, silica gel, rubber, polyimide (PI) material, polyvinylchloride (PVC) material, polyethylene terephthalate (PET) material and the like. In some embodiments, the photocurable material may include any one or a combination of two or more of the following materials: acrylate material, polyurethane ultraviolet photocurable (UV) coating, photosensitive resin and the like. In some embodiments, the ultra-thin metal alloy may include any one or a combination of two or more of the following materials: aluminum alloy, nickel alloy, titanium alloy and the like. In some embodiments, the textile material may include any one or a combination of two or more of the following materials: leather, cloth, silk and the like.

Figure 12A:
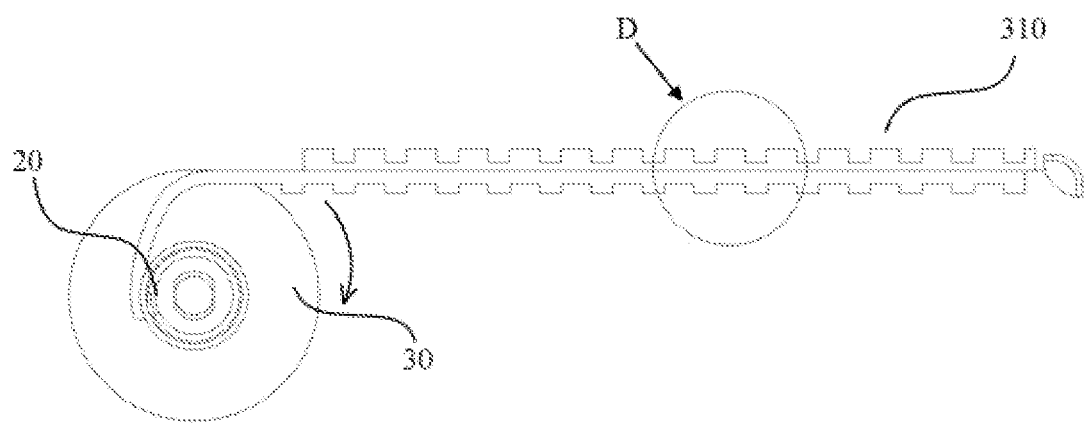
FIG. 12A is a schematic view of a bordure structure shown according to still further embodiments of the application.
Figure 12B:
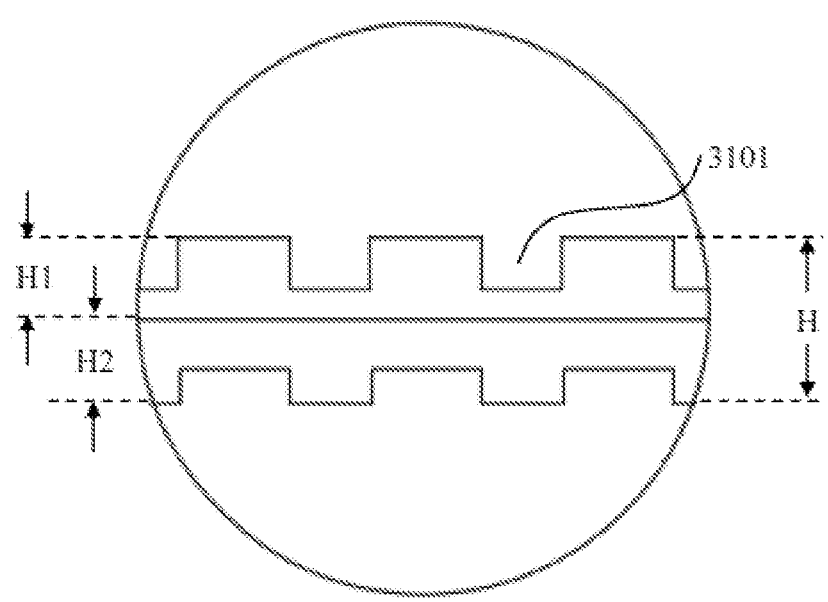
FIG. 12B is a partial enlarged view of a region D in FIG. 12A according to the application.

In some embodiments, further referring to FIGS. 12A and 12B, a thickness H of the bordure 310 may be any numerical value between 0.1 mm and 4 mm; in some embodiments, may be any numerical value between 0.2 mm and 2 mm; in some embodiments, may be any numerical value between 0.4 mm and 1 mm. In some embodiments, a thickness H1 of the bordure 310 at the front surface of the screen 10 may be any numerical value between 0.05 mm and 2 mm; in some embodiments, may be any numerical value between 0.1 mm and 1 mm; in some embodiments, may be any numerical value between 0.2 mm and 0.5 mm. In some embodiments, a thickness H2 of the bordure 310 at the back surface of the screen 10 may be any numerical value between 0.05 mm and 2 mm; in some embodiments, may be any numerical value between 0.1 mm and 1 mm; in some embodiments, may be any numerical value between 0.2 mm and 0.5 mm. In some embodiments, the thickness H1 of the bordure 310 at the front surface of the screen 10 may be identical to the thickness H2 at the back surface of the screen 10. In some embodiments, the thickness of the bordure 310 at the front surface of the screen 10 may also be different from the thickness at the back surface of the screen 10.

In some embodiments, the bordure 310 may have a certain outer shape. The outer shape is a shape formed by a plurality of notches disposed on the bordure. In some embodiments, referring to FIGS. 12A and 12B, the upper side and the lower side of the bordure 310 are provided with a plurality of notches 3101. When the bordure 310 is curled in the clockwise direction as shown, the notches disposed on the lower side of the bordure 310 are directed toward the curled center of the bordure 310, and the notches disposed on the upper side of the bordure are directed away from the curled center. In some embodiments, the notches may also be provided on only one of the upper side and the lower side of the bordure 310. In some embodiments, the notches 3101 may reduce the amount of deformation of the bordure 310 compressed during curling, as well as a stress resulting from tensioning under compression during curling. In some embodiments, the outer shape include, but is not limited to, a serrated shape, a wavy shape, and a crenelated shape.

Figure 11A:
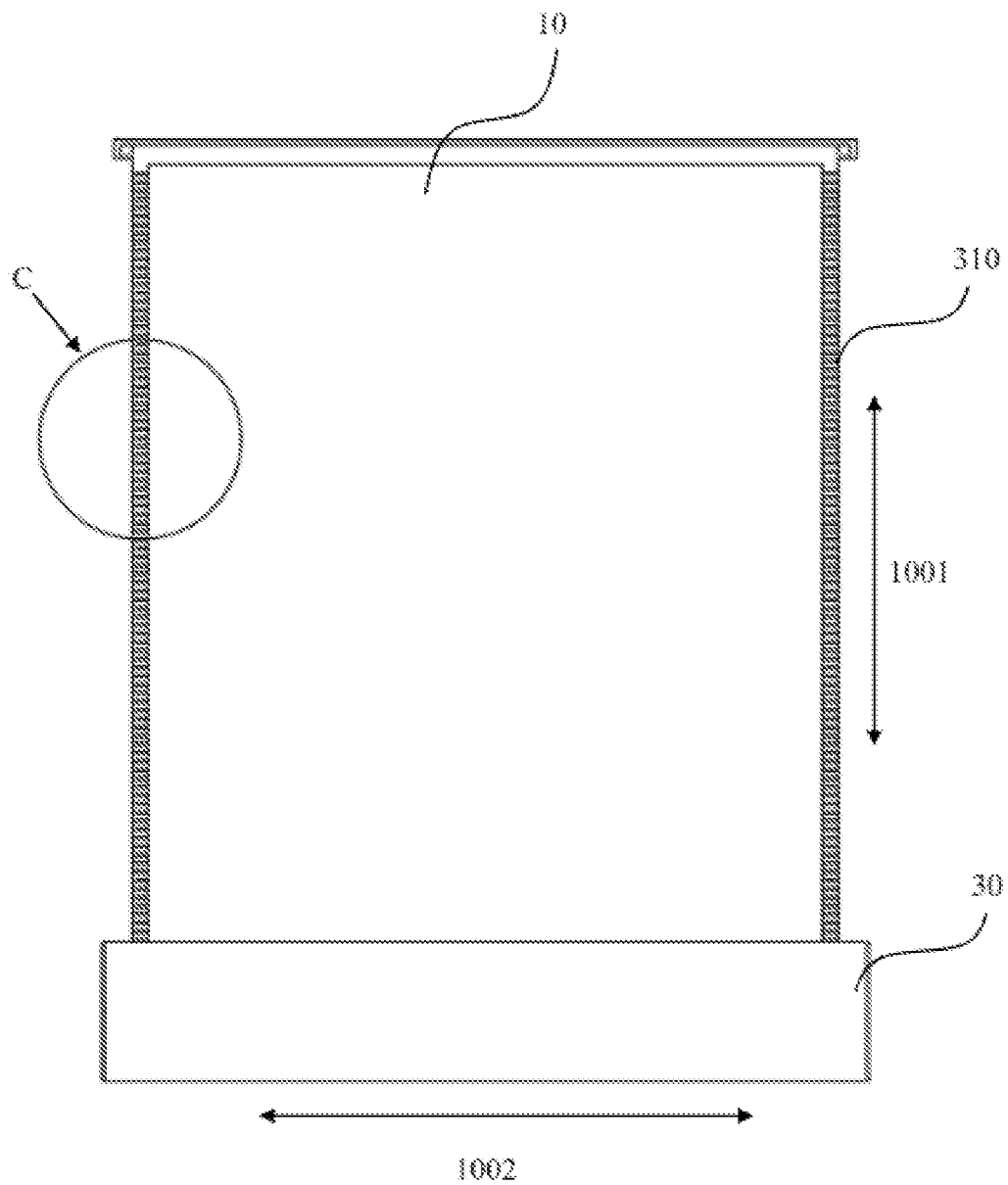
FIG. 11A is a schematic top view of a flexible display device in an unfolded state shown according to a fourth embodiment of the application.
Figure 11B:
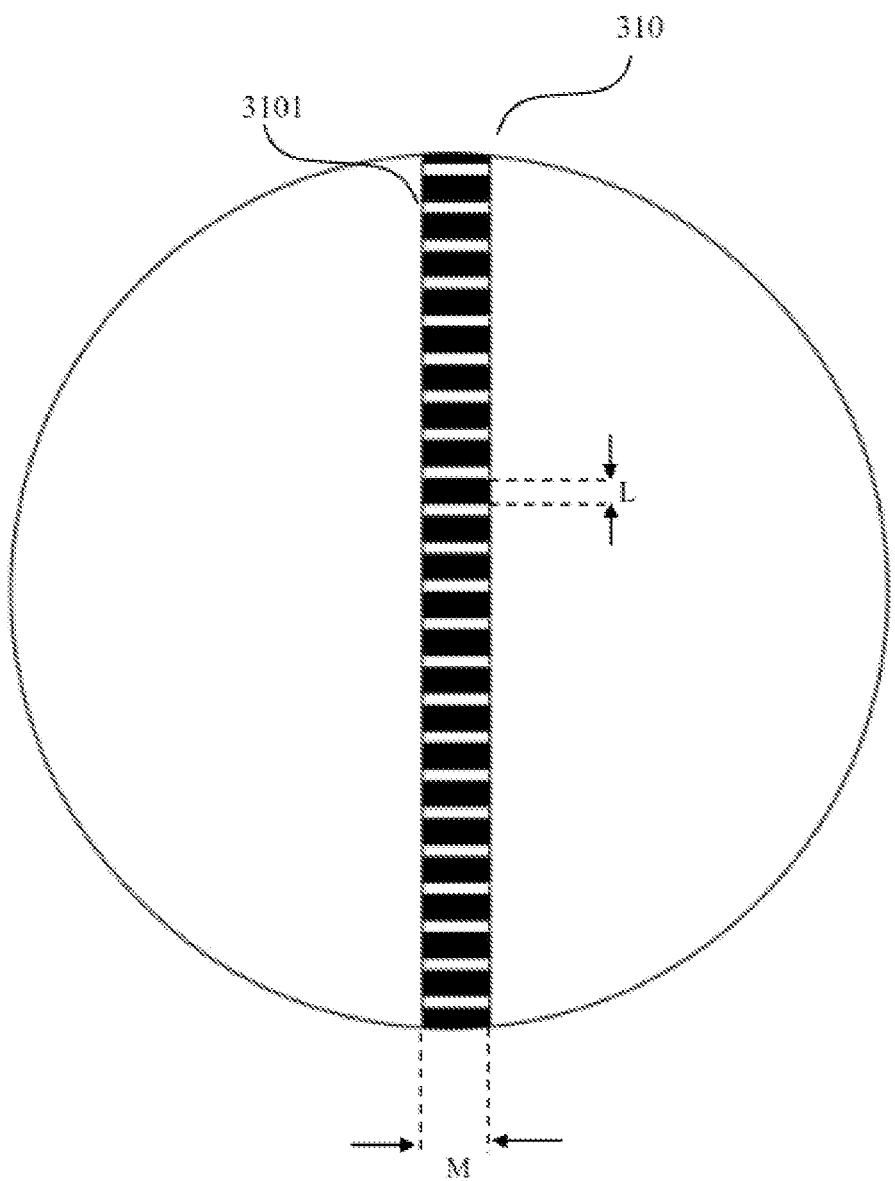
FIG. 11B is a partial enlarged view of a region C in FIG. 11A according to the application.

Referring to FIGS. 11A and 11B, in some embodiments, the notches 3101 may be distributed in the curled direction (e.g., the first direction 1001) of the bordure. In some embodiments, the size of each notch 3101 in the curled direction of the bordure 310 may be any numerical value between 0.1 mm and 10 mm; in some embodiments, the size of the notch 3101 in the curled direction may be any numerical value between 0.5 mm and 9 mm; in some embodiments, the size of the notch 3101 in the curled direction may be any numerical value between 1 mm and 8 mm; in some embodiments, the size of the notch 3101 in the curled direction may be any numerical value between 2 mm and 6 mm; in some embodiments, the size of the notch 3101 in the curled direction may be any numerical value between 3 mm and 5 mm. The size of each notch 3101 in the direction perpendicular to the curled direction of the bordure (e.g., the second direction) may be any numerical value between 0.1 mm and 3 mm; in some embodiments, the size of the notch 3101 in the direction perpendicular to the curled direction may be any numerical value between 0.5 mm and 2.5 mm; in some embodiments, the size of the notch 3101 in the direction perpendicular to the curled direction may be any numerical value between 1 mm and 2 mm. In some embodiments, the spacing between two adjacent notches 3101 may be any numerical value between 0.1 mm and 10 mm; in some embodiments, the spacing between two adjacent notches 3101 may be any numerical value between 0.5 mm and 9 mm; in some embodiments, the spacing between two adjacent notches 3101 may be any numerical value between 1 mm and 8 mm; in some embodiments, the spacing between two adjacent notches 3101 may be any numerical value between 2 mm and 6 mm; in some embodiments, the spacing between two adjacent notches 3101 may be any numerical value between 3 mm and 5 mm. In some embodiments, the plurality of notches 3101 may be uniformly distributed in the curled direction of the bordure 3101, or may be non-uniformly distributed. Herein the non-uniform distribution may include a gradual distribution from dense to sparse. For example, the bordure 3101 corresponding to the starting end of the display screen body 10 has the smallest curled radius and the largest curled amplitude, so that the distribution density of the notches 3101 may be set to be the densest, and the size of the notch 3101 in the curled direction of the bordure may also be set larger.

Figure 13A:
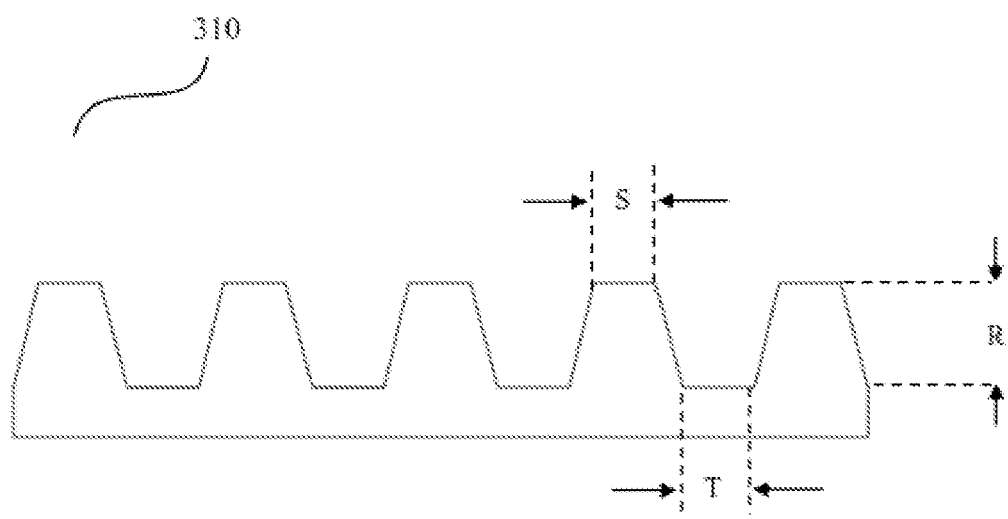
FIG. 13A is a schematic view of notches of a bordure structure shown according to some embodiments of the application.
Figure 13B:
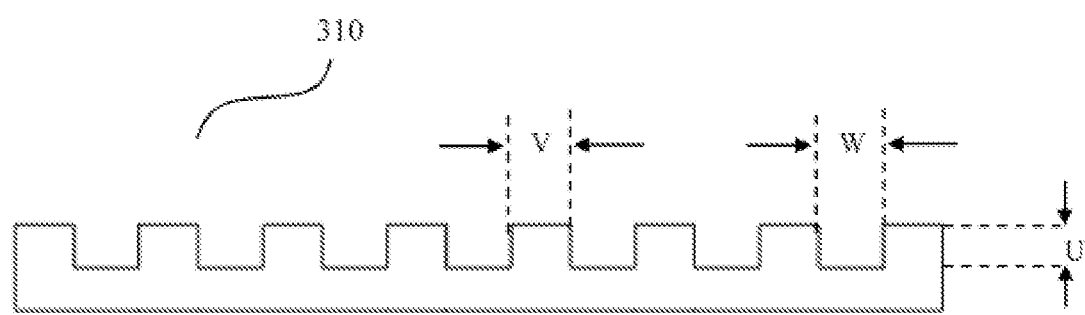
FIG. 13B is a schematic view of notches of a bordure structure shown according to still further embodiments of the application.
Figure 13C:
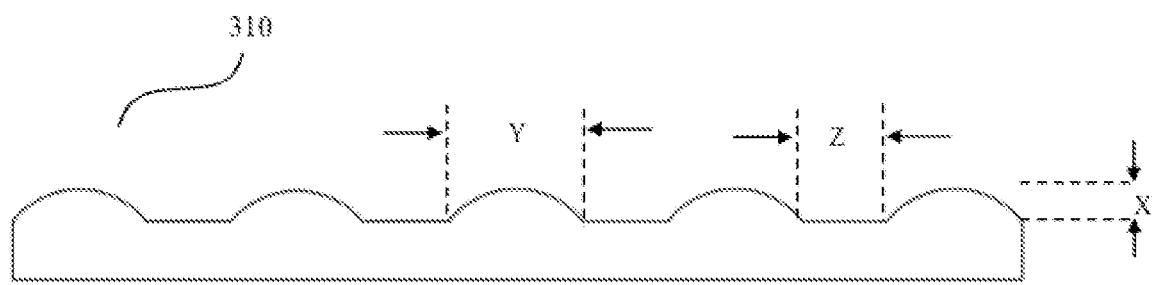
FIG. 13C is a schematic view of notches of a bordure structure shown according to other embodiments of the application.

The specific shape of the outer shape formed by the plurality of notches 3101 may be further seen in FIGS. 13A-13C. In some embodiments, the outer shape may be a serrated shape, as shown in FIG. 13A. In some embodiments, a height R of the serrated shape may be any numerical value between 0.1 mm and 4 mm. In some embodiments, a protrusion width S of the serrated shape may be any numerical value between 0.01 mm and 10 mm. In some embodiments, a recess width T of the serrated shape may be any numerical value between 0.01 mm and 10 mm.

In some embodiments, the outer shape may be a crenelated shape. In some embodiments, a height U of the crenelated shape may be any numerical value between 0.1 mm and 4 mm. In some embodiments, a protrusion width V of the crenelated shape may be any numerical value between 0.01 mm and 10 mm. In some embodiments, a recess width W of the crenelated shape may be any numerical value between 0.01 mm and 10 mm.

In some embodiments, the outer shape may be a wavy shape. In some embodiments, the curve of the wavy shape may include, but is not limited to, a sinusoidal curve, a normal distribution curves, a parabola, a circular arc and the like. In some embodiments, the wavy curve may be a full wave curve or a half wave curve. In some embodiments, a height X of the wavy shape may be any numerical value between 0.1 mm and 4 mm. In some embodiments, a protrusion width Y of the wavy shape may be any numerical value between 0.01 mm and 10 mm. In some embodiments, a recess width Z of the wavy shape may be any numerical value between 0.01 mm and 10 mm.

In some embodiments, the width of the plurality of notches 3101 in the first direction 1001 may be constant. In some embodiments, the width of the plurality of notches 3101 in the first direction 1001 may vary gradually. In some embodiments, the width of the notch 3101 is larger in the first direction 1001 at an end close to the rotation shaft 20, and is less in the first direction 1001 in an end away from the rotation shaft 20. For example, when the outer shape formed by the plurality of notches 3101 is the crenelated shape, the recess width of the crenelated shape (i.e., the width of the notch in the first direction) is larger at the end close to the rotation shaft 20, and the recess width of the crenelated shape is less at the end away from the rotation shaft 20.

Figure 14:
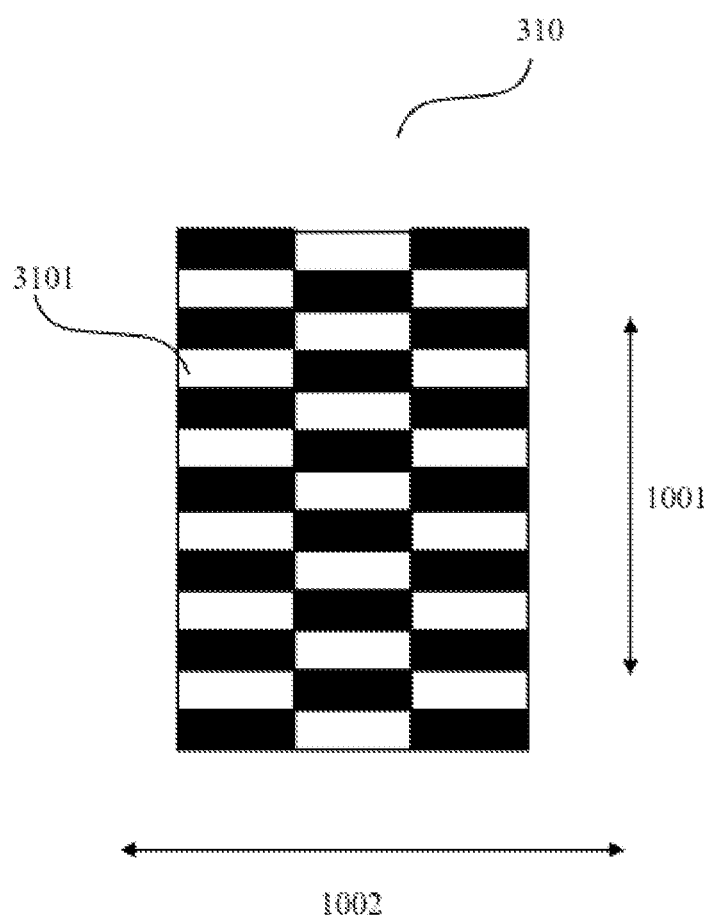
FIG. 14 is a schematic view of notches distribution of a bordure structure shown according to some embodiments of the application.

In some embodiments, the notches 3101 may be located only on the lower side of the bordure 310, that is, no notch is provided on the upper side of the bordure 310, so as to improve the overall appearance of the front surface of the screen 10. Herein the lower side of the bordure 310 may be a side corresponding to the back surface of the display screen body 10, and the upper side of the bordure 310 may be a side corresponding the front surface of the display screen body. In some embodiments, referring to FIGS. 11A and 11B, the number of the notches 3101 in the second direction 1002 may be one. In some embodiments, further referring to FIG. 14, the number of notches 3101 in the second direction 1002 may also be plural. In some embodiments, the plurality of notches 3101 in the second direction 1002 may be distributed in the same straight line, or may also be distributed in a staggered manner as shown in FIG. 14.

In some embodiments, the notches 3101 may be located on the upper side of the bordure 310, and the upper side of the bordure 310 may be a side corresponding to the front surface of the display screen body 10. The distribution rule thereof may be set with reference to the embodiments of the notches located on the lower side of the bordure 310.

In some embodiments, further referring to FIGS. 12A and 12B, the notches 3101 may be located on both the upper side and the lower side of the bordure 310. In some embodiments, the notches 3101 may be the same or different on the upper side and the lower side of the bordure 310. Preferably, the notches 3101 are different on the upper side and the lower side of the bordure 310.

In some embodiments, further referring to FIG. 12B, a plurality of notches 3101 may be distributed in the second direction 1002 on each of the upper side and the lower side of the bordure 310. In some embodiments, the notches 3101 on the upper side and the notches 3101 on the lower side of the bordure 310 may be staggered with each other, as shown in FIG. 12B. In some embodiments, when the flexible display device is curled, the notches 3101 corresponding to each other on the upper side and the lower side of the bordure 310 may fit with each other to prevent the display screen body 10 from sliding in the second direction 1002.

In some embodiments, the cross section shape of the bordure 310 in a direction perpendicular to the curled direction of the bordure may also include an uneven edge shape. Here the uneven edge shape may include, but is not limited to, an arc shape, a wavy shape, a capsule shape, a semi-circular shape, a rectangular shape, a crenelated shape, a pattern shape and the like. In some embodiments, the edge shape of the upper side and the edge shape of the lower side of the bordure 310 may correspond to each other, such that the bordure, during being curled, the recess in the edge shape of the upper side thereof can be form-fit with the protrusion in the edge shape of the lower side to reduce the risk of slip misalignment of the bordure 310 in the direction perpendicular to the curled direction of the bordure.

In some embodiments, the bordure 310 may be fixed to the display screen body 10. In some embodiments, the bordure 310 may be fixed to the display screen body 10 by adhering. In some embodiments, the bordure 310 may also be fixed to the display screen body 10 by hot press molding. For example, the bordure 310 may be a component other than the display screen body 10, and the bordure 310 and the display screen body 10 are fixed together by hot press after the display screen body 10 is manufactured. In some embodiments, the bordure 310 may also be connected to the display screen body 10 by curing a liquid material. Here the liquid material may be a photocurable material including, but not limited to, an acrylate material, a polyurethane ultraviolet photocurable (UV) coating, a photosensitive resin and the like.

In some embodiments, the bordure 310 may also be detachably connected to the display screen body 10. In some embodiments, the type of the detachable connection may include, but is not limited to, a slot connection, a snapping connection, magnetic attraction, electrostatic adherence and the like. In some embodiments, the bordure 310 may have a slot with a width equal to a thickness of the display screen body 10. The first side and the second side of the display screen body 10 may be inserted into the slot to connect the display screen body 10 to the bordure 310, and the display screen body 10 may be separated from the bordure structure by sliding the display screen body 10 out of the slot. In some embodiments, a region of the bordure 310 in contact with the display screen body may include a magnetic layer, and the corresponding region on the display screen body 10 may include an adsorption layer capable of being magnetically acted upon. When the magnetic layer of the bordure 310 is close to the adsorption layer on the display screen body 10, the magnetic layer and the adsorption layer may be connected together by an adsorption force, and an external force greater than the adsorption force may be applied to the two to separate them. In some embodiments, a region where the bordure 310 and the display screen body 10 contact with each other may be configured as a material capable of generating electrostatic attraction, such that the bordure and display screen body can be abutting-joint by electrostatic attraction.

In some embodiments, the bordure 310 may be used as a detachable accessory for the display screen body 10. When the flexible display device requires abrasion protection during curling, the bordure 310 may be attached to the display screen body 10 before the curling is performed, so as to prevent abrasion of the display screen body during curling. When the flexible display device does not require abrasion protection (e.g., when unfolded), the bordure 310 may be detached from the display screen body 10, so as to keep the display screen body 10 thin. In some embodiments, the bordure 310 may be used as a support structure for the display screen body 10. When the display screen body 10 is unfolded, it is not required to detach the bordure 310 and the bordure 310 may provide support for the unfolded display screen body 10.

In some embodiments, since the bordure 310 is located at the first side and the second side of the display screen body 10, when the display screen body 10 is curled, contact may still occur in the middle region of the display screen body 10. Thus, an additional isolation structure may be used to isolate the display screen body 10 in the middle region thereof. In some embodiments, the isolation structure may include, but is not limited to, a spiral groove.

In some embodiments, the isolation component may also include both the spiral groove 210 and the bordure 310. In some embodiments, the amount of the spiral groove 210 may be one or may also be plural. In some embodiments, the ratio of the length of the spiral groove in the direction of axis to the length of the display screen body 10 in the second direction 1002 may be less than 1; in some embodiments, since the display screen body 10 is isolated by both the bordure 310 and the spiral groove 210, said ratio may be less than 0.5; in some embodiments, said ratio may be less than 0.3; in some embodiments, said ratio may be less than 0.2. In some embodiments, the ratio of the length of the spiral groove to the length of the display screen body 10 may be 0.1-1; in other embodiments, the ratio of the length of the spiral groove to the length of the display screen body 10 may be 0.2-0.9, in some embodiments, the ratio of the length of the spiral groove to the length of the display screen body 10 may be 0.3-0.8; in other embodiments, the ratio of the length of the spiral groove to the length of the display screen body 10 may be 0.4-0.7; in some embodiments, the ratio of the length of the spiral groove to the length of the display screen body 10 may be 0.5-0.6. When the flexible display device is curled, the first side and the second side of the display screen body 10 are exposed to the outside of the spiral groove and are vulnerable to the external environment. In some embodiments, the first side and the second side of the display screen body 10 may be provided with a bordure 310 to protect them and prevent the first side and the second side of the display screen body 10 from being exposed to the external environment. It should be noted that the structure, material, and size of the spiral groove 210 and the bordure 310 in the embodiment may be set with reference to the relevant contents in the above embodiments, and are not repeated here.

Figure 15:
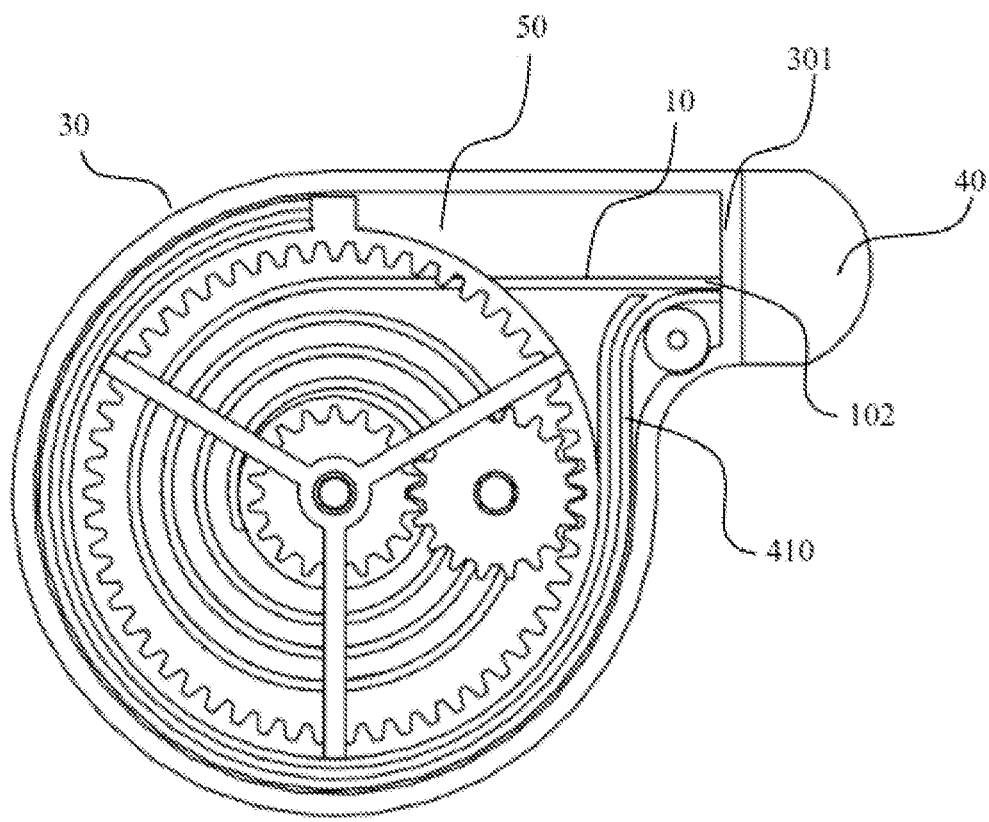
FIG. 15 is a schematic structural view of a flexible display device in a curled state shown according to some embodiments of the application.

In some embodiments, the functional auxiliary structure includes a support component. The support component may support the display screen body 10 when the display screen body 10 is in the unfolded state, so as to prevent the display screen body 10 from wrinkling or spreading out unevenly, so that the display effect of the display screen body 10 is ensured. In some embodiments, as shown in FIG. 15, the support component includes a support member 410 detachably connected to the display screen body 10, and a transmission component 50 disposed between the display screen body 10 and the support member 410. Herein the detachable connection may be interpreted as that the support member and the display screen body can be separate from each other in some states and can be connected to each other in some other states. Herein under the effect of the transmission component, the support member 410 engages with the display screen body 10 when the flexible display device 200 is in the unfolded state, and the support member 410 is at least partially separate from the display screen body 10 when the flexible display device 200 is in the curled state. The type of engagement of the support member 410 and the display screen body 10 may include, but is not limited to, abutting joint, coupling, partial coupling or partial abutting joint and the like.

Figure 16:
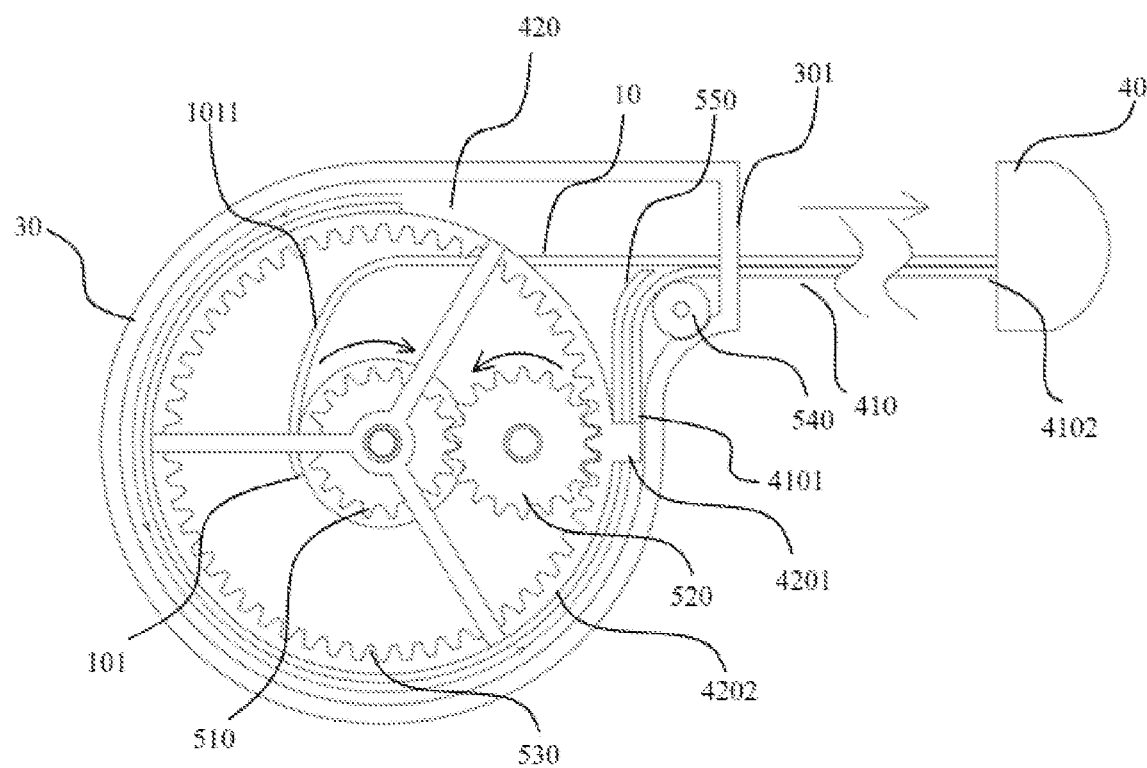
FIG. 16 is a schematic structural view of a flexible display device in an unfolded state shown according to a fifth embodiment of the application.

In some embodiments, as shown in FIG. 15, when the flexible display device 200 is required to be curled and stored, the support member 410 and the display screen body 10 may be separate from each other to curl up separately. As shown in FIG. 16, when the flexible display device 200 is unfolded, the support member 410 and the display screen body 10 can be abutting-joint with each other. The above solution can not only play a good role of supporting in the displaying state and ensure the display screen body 10 to display flatly, but also facilitate detaching and mounting of the support member 410 for ease of replacing or cleaning and maintaining the worn support member. In addition, since the support member 410 and the display screen body 10 are separated from each other when being curled, it is also possible to prevent the flexible display device 200 from generating an additional curling stress when being curled.

In some embodiments, the type of abutting joint of the support member 410 and the display screen body 10 may be a detachable connection easily separated and with a certain abutting joint strength, including, but not limited to, magnetic abutting joint, electrostatic abutting joint and the like.

In some embodiments, the cooperating surfaces of the support member 410 and the display screen body 10 may be provided with magnetic components (e.g., magnetic strips) attracting each other. During unfolding of the flexible display device, the support member 410 and the display screen body 10 may be attracted to be abutting-joint when being drawn to a housing outlet 301. During curling of the flexible display device, the support member 410 and the display screen body 10 are separated to the respective curled positions when being retracted to the position of the housing outlet 301. In some embodiments, one of the two cooperating surfaces of the support member 410 and the display screen body 10 may include an electrostatically charged object, and the other may be configured to include an object capable of being electrostatically induced with the electrostatically charged object. The two cooperating surfaces can be abutting-joint with each other due to electrostatic adsorption when being close to each other during unfolding. During curling, the support member 410 and the display screen body 10 can be separated from each other to the respective curled positions.

In some embodiments, a press member (not shown) may be provided at the position of the housing outlet 301. For example, a spring-tensioned press block is provided at above and below the housing outlet respectively, and the support member 410 and the display screen body 10, when moving to the position of the housing outlet, are pressed by the press blocks and stuck together, and can be separated by an driving force when being curled up.

In some embodiments, after the flexible display device 200 is curled, the display screen body 10 and the support member 410 may be simultaneously stored in the housing 30. In some embodiments, in order to ensure that the support member 410 in the unfolded state can be abutting-joint with the display screen body 10 better, the transmission component 50 is required to make the display screen body 10 and support member 410 move at the same linear velocity when being unfolded.

In some embodiments, as shown in FIG. 16, the flexible display device 200 may include a rotation shaft 20, and the support component may include a rotation member 420. In some embodiments, the starting end 101 of the display screen body 10 may be connected to the rotation shaft 20. A first end 4101 of the support member 410 may be connected to the rotation member 420. The tail end 102 of the display screen body 10 is connected to a second end 4102 of the support member 410. In some embodiments, the tail end 102 of the display screen body 10 and the second end 4102 of the support member 410 may be relatively fixedly disposed on a handle 40. In some embodiments, the tail end 102 of the display screen body 10 and the second end 4102 of the support member 410 may also be fixed at the same position of the handle 40. In some embodiments, the rotation member 420 and the rotation shaft 20 can rotate relative to each other, such that the rotation member 420 and the rotation shaft 20 can drive the support member 410 and the display screen body 10 respectively to be curled or unfolded.

In some embodiments, the connection of the starting end 101 to the rotation shaft 20 may be a fixed connection (e.g., hot press molding) or a detachable connection (e.g., a slot connection). In some embodiments, the connection of the first end 4101 to the rotation member 420 may be a fixed connection (e.g., hot press molding) or a detachable connection (e.g., a slot connection).

Figure 17:
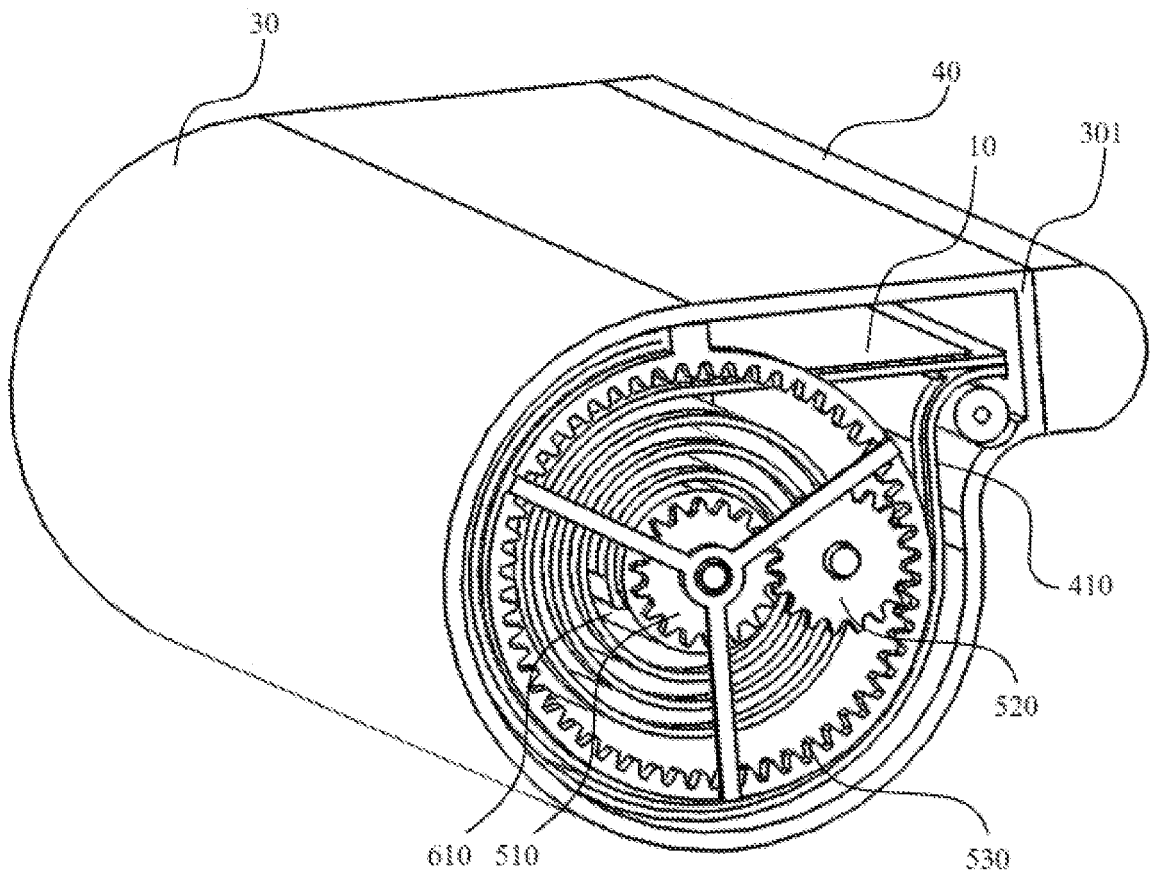
FIG. 17 is an isometric view of a flexible display device in a curled state shown according to some embodiments of the application.

In some embodiments, as shown in FIGS. 16 and 17, the transmission component disposed between the display screen body 10 and the support member 410 may include a rotation gear 510 connected to the rotation shaft 20, an inner ring gear 530 disposed on the rotation member 420, and an intermediate gear 520 disposed between the rotation gear 510 and the inner ring gear 530. The rotation shaft 20 and the rotation gear 510 may be fixedly connected to each other, that is, the rotation shaft 20 rotates in synchronization with the rotation gear 510. The intermediate gear 520 disposed between the rotation gear 510 and the inner ring gear 530 is capable of transmitting the rotation of the rotation gear 510 to the inner ring gear 530. In some embodiments, a shaft of the intermediate gear 520 may be fixedly disposed with respect to the housing 30, and the intermediate gear 520 is disposed idly with respect to a shaft on which the intermediate gear 520 is located, enabling the intermediate gear 520 to transmit the rotation of the rotation gear 510 to the inner ring gear 530, so that the rotation gear 510 and the inner ring gear 530 have the same rotational linear speed.

In some embodiments, the rotation member 420 may include a rotation ring 4202 and a fixing portion 4201 disposed on an outer circumference of the rotation ring 420. The fixing portion 4201 is used to fix the first end 4101 of the support member 410 to the rotation ring 4202. Here the rotation ring 4202 can rotate relative to the rotation shaft 20, and the support member 410 can be wound onto the outer circumference of the rotation ring 4202. When the rotation ring 4202 rotates, the fixing portion 4201 can drive the support member 410 to be curled or unfolded with respect to the outer circumference of the rotation ring 4202. In some embodiments, a width of the outer circumference of the rotation ring 4202 in the direction of axis of the rotation ring 4204 may be greater than or equal to a width of the support member 410, so that the support member 410 may be stably wound onto the rotation ring 4202. In some embodiments, the inner ring gear 530 may be integrally disposed on the inner circumference of the rotation ring 4202. In some embodiments, the type of the fixing portion 4201 fixing the first end 4101 of the support member 410 to the rotation ring 4202 may be a detachable connection. Herein the detachable connection may include, but is not limited to, a hook connection, a snapping connection and the like, and the connection type is advantageous for detaching, mounting and replacing the support member 410.

In some embodiments, a rotation direction of the rotation shaft 20 may be opposite to the rotation ring 4202, so that when the rotation shaft 20 drive the display screen body 10 to be unfolded relative to the outer ring of the rotation shaft 20, the rotation ring 4202 can drive the support member 410 to be unfolded as well. In particular, as shown in FIG. 16, when the rotation shaft 20 rotates clockwise (as viewed from the inward direction of the paper) at the illustrated angle, the rotation gear 510 fixed thereto rotates clockwise therewith, thereby driving the display screen body 10 to be unfolded. At the same time, the rotation gear 510 drives the intermediate gear 520 to rotate, and the intermediate gear 520 drives the inner ring gear 530 to rotate. Herein, since the intermediate gear 520 is externally meshed with the rotation gear 510, the rotation direction of the intermediate gear 520 is opposite to the rotation direction of the rotation gear 510, that is, a counterclockwise rotation. Since the inner ring gear 530 is internally meshed with the intermediate gear 520 and rotates in the same direction, the inner ring gear 530 rotates counterclockwise, so that the rotation ring 4202 rotates counterclockwise and drives the support member 410 to be unfolded.

Figure 18:
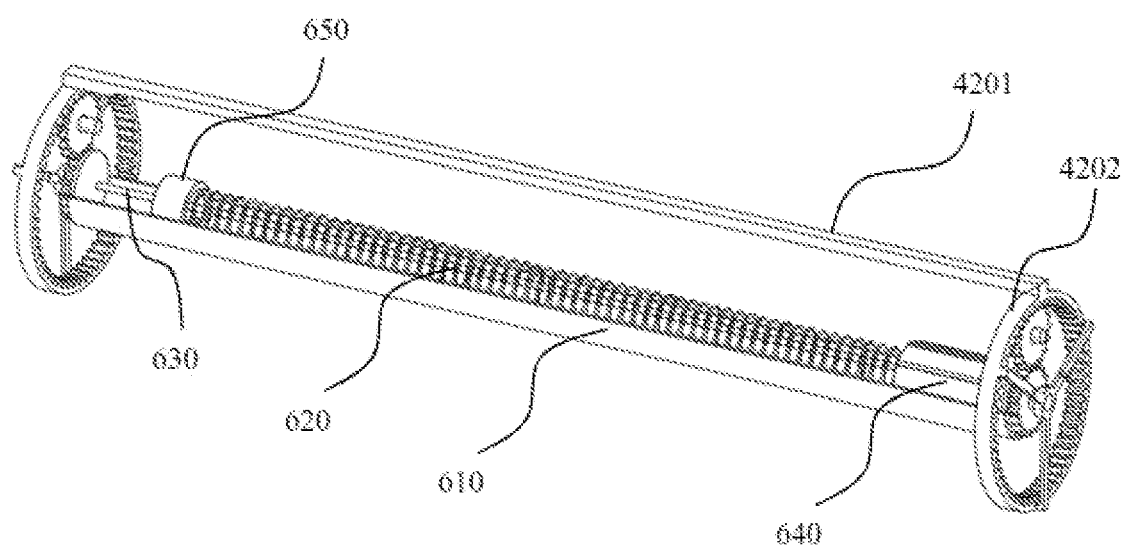
FIG. 18 is a schematic structural view of a swing mechanism shown according to some embodiments of the application.

As shown in FIG. 18, in some embodiments, the fixing portion 4201 may have a rod shape, and the longitudinal direction of the fixing portion 2201 of rod shape is parallel to the rotation shaft 20. In some embodiments, the length of the fixing portion 4201 is greater than or equal to the width of the support member 410. In some embodiments, the first end 4101 of the support member 410 is fixed to the fixing portion 4201, and the width direction of the support member 410 may be substantially parallel to the longitudinal direction of the fixing portion 4201. The width direction of the support member 410 may be the direction perpendicular to the winding direction thereof.

The transmission component in one or more above embodiments may be disposed at one end of the rotation shaft 20, or may be simultaneously disposed at two ends of the rotation shaft 20.

If the transmission component is simultaneously disposed at two ends of the rotation shaft 20, the rotation shaft 20 drives the display screen body 10 to be curled or unfolded, and two rotation rings 4202 at two ends of the rotation shaft 20 drive the respective support members 410 respectively to be curled or unfolded. In order to enable the support members 410 at the two ends of the rotation shaft 20 to maintain synchronism of movement, it is required that the two rotation rings 4202 may rotate synchronously. In some embodiments, the two rotation rings 4202 may also be connected together by the fixing portion 4201, and the axis of the fixing portion 4201 and the axis of the rotation shaft 20 are parallel to each other, as shown in FIG. 18.

In some embodiments, the size of the support member 410 in the width direction, i.e., the width of the support member 410, may be set according to support requirements. If it is required to support the entire region of the display screen body 10, the width of the support member 410 is required to be substantially identical to the width of the display screen body 10 (the size of the display screen body 10 in the second direction), so that the entire region of the display screen body 10 in the unfolded state is abutting-joint with the support member 410. If it is required to support a partial region of the display screen body 10, the width of the support member 410 may be set to be smaller. In some embodiments, a ratio of the width of the support member 410 to the width of the display screen body 10 is 0.1-0.8; in some embodiments, said ratio of width may also be 0.2-0.7; in some embodiments, said ratio of width may also be 0.3-0.6. In some embodiments, said ratio of width may also be 0.4-0.5. It should be noted that the width of the support member 410 described above refers to the sum of the widths of all the support members capable of being abutting-joint on the surface of the display screen body 10. As shown in FIG. 16, in some embodiments, the starting end 101 of the display screen body 10 may include a connection portion 1011. In some embodiments, the connection portion 1011 is used only to connect the display screen body 10 to the rotation shaft 20, and is not used to display information. In some embodiments, the material of the connection portion 1011 may be different from the material of other regions (e.g., the displaying region) on the display screen body 10. In some embodiments, the material of the connection portion 1011 may be a commonly used flexible material including, but not limited to, rubber material, plastic material, textile material, leather material and the like. In some embodiments, when the display screen body 10 is unfolded, the length of the connection portion 1011 should ensure that the unfolded displaying region of the display screen body 10 is completely exposed to the outside of the housing 30, so as to ensure displaying information completely. In some embodiments, the material of the connection portion 1011 may be the same as the material of other regions (e.g., the displaying region) on the display screen body 10.

In some embodiments, the flexible display device 200 may further include a drive component for driving the rotation shaft 20 to rotate, thereby driving the display screen body 10 to be curled and/or unfolded. In some embodiments, the drive component may drive the rotation shaft 20 to drive the display screen body 10 to be curled only; in some embodiments, the drive component may drive the rotation shaft 20 to drive the display screen body 10 to be unfolded only; in some embodiments, the drive component may drive the rotation shaft 10 to drive the display screen body 10 be curled and unfolded. In some embodiments, the drive component may include, but is not limited to, a rocker arm structure, a spring drive structure, a clockwork structure, a motor drive structure, a cylinder drive structure and the like. For example, a rocker arm may be mounted on the rotation shaft 20, and manual rotation of the rocker arm in curling may enable the rotation shaft 20 to rotate in different directions, thereby enabling the display screen body 10 to be curled or unfolded. Also, for example, a torsion spring may be mounted on the rotation shaft 20, and the torsion spring can provide a return force to the rotation shaft 20 when automatically returning to the curled state, and thereby automatic curling of the flexible display device may be enabled. In particular, when the flexible display device is unfolded, it is required to manually pull the display screen body out, so that the torsion spring is compressed, and the torsion spring rebounds to drive the rotation shaft to rotate during curling. For another example, a clockwork device may be mounted on the rotation shaft 20. The clockwork is wound up by manual operation before being curled or unfolded for force accumulation, and the clockwork rebounds after completing the force accumulation, thereby driving the display screen body to be curled or unfolded. For another example, a drive motor may also be mounted on the rotation shaft 20. When curling or unfolding is required, the rotation shaft 20 is driven to rotate in a corresponding direction by controlling the rotation of the motor, so as to achieve curling or unfolding of the display screen body 10. For another example, a rotation cylinder may be mounted to an end of the rotation shaft 20. When being curled or unfolded, the rotation shaft 20 is driven to rotate by controlling the rotation cylinder, so as to achieve curling or unfolding of the display screen body 10.

In some embodiments, when the drive component includes a drive motor structure, the drive motor can drive the rotation shaft to rotate in a first rotation direction and a second rotation direction. In some embodiments, the first rotation direction may be interpreted as the rotation direction enabling the flexible display device to be curled, and the second rotation direction may be interpreted as the rotation direction enabling the flexible display device to be unfolded. Specifically, when the display screen body 10 is required to be curled, the motor may be controlled to rotate in a certain direction to drive the rotation shaft 20 to be rotatable in the first rotation direction, and the display screen body 10 is wound on the rotation shaft 20. Meanwhile, the rotation shaft 20 rotating in the first rotation direction, under the action of the rotation gear 510, the intermediate gear 520 and the ring gear 530, may rotate the rotation member 420 in the direction opposite to the first rotation direction, so that the support member 410 is thereby curled up as well. When the display screen body 10 is required to be unfolded, the motor may be controlled to rotate reversely to drive the rotation shaft 20 to rotate in the second rotation direction, so that both the display screen body 10 and the support member 410 are unfolded.

In some embodiments, a sensing device may also be added to the drive device to enable automated or intelligent control of the drive device. In some embodiments, the sensing device may include, but is not limit to, an infrared sensor, a voice-activated sensor, a wireless sensing module, a Bluetooth sensing module and the like. For example, the drive component may be actuated remotely by an infrared remote controller to achieve curling or unfolding of the display screen body 10 quickly with one button. For another example, a voice-activated drive component may also be used to achieve curling or unfolding of the flexible display device. For another example, other intelligent devices may also be used to actuate the drive component by a wireless signal or a Bluetooth signal, so as to remotely achieve curling or unfolding of the display screen body 10.

Further, the drive motor may also be used in combination with some automatic or intelligent devices to enhance the convenience of use. In some embodiments, a human infrared sensor may be used in combination, and when the human infrared sensor detects that there is no viewer, the drive motor may be automatically actuated and curl the display screen body 10 up, avoiding forgetting to curling up so as to save energy and protect the display screen. In some embodiments, a sound sensor may also be used in combination, so that the user may control the rotation of the drive motor with voice to achieve curling or unfolding of the display screen body 10. In some embodiments, a wireless module, a Bluetooth module and the like may also be used in combination so as to achieve remote control and convenient use. For example, other intelligent devices are used to actuate the drive motor by a wireless signal or a Bluetooth signal, so as to remotely achieve curling or unfolding of the display screen body 10.

In some embodiments, referring to FIG. 18, the drive component may further include a spring drive structure. The spring drive structure may include a torsion spring 620 disposed on the rotation shaft 20. The torsion spring 620 can provide a return force to the rotation shaft 20 in the first rotation direction, so that the rotation of the rotation shaft 20 may drive the display screen body 10 to be automatically curled. In some embodiments, the torsion spring 620 may be encircled on the rotation shaft 20. In some embodiments, when the display screen body 10 is pulled by an external force to be unfolded, the display screen body 10 may drive the rotation shaft 20 to rotate, so that the torsion spring 620 is deformed and accumulates elastic potential energy. When the external force pulling the display screen body 10 disappears, the torsion spring 620 may release the elastic potential energy and drive the rotation shaft 20 to rotate, so as to curl the display screen body 10 onto the rotation shaft 20.

In some embodiments, referring to FIG. 18, the spring drive structure may further include a sleeve 610 connected to the rotation shaft 20, and the sleeve 610 can rotate in synchronization with the rotation shaft 20. Herein the sleeve 610 may be encircled outside the rotation shaft 20, and the torsion spring 620 is located between the sleeve 610 and the rotation shaft 20. In some embodiments, as further shown in FIG. 17, the starting end 101 of the display screen body 10 is connected to the sleeve 610, and may drive the display screen body 10 to be wound around the outer wall of the sleeve 610 when the rotation shaft 20 rotates.

In some embodiments, referring to FIG. 18, the spring drive structure may further include a support shaft 630, a movable block 640, and a fixed block 650. Here, the support shaft 630 may be fixedly disposed with respect to the housing 30. In some embodiments, the fixed block 650 may be fixedly disposed on the support shaft 630, and the movable block 640 may be encircled on the support shaft 630 and may rotate with respect to the support shaft 630. In some embodiments, one end of the torsion spring 620 is fixedly connected to the fixed block 650, and the other end is fixedly connected to the movable block 640. In some embodiments, when the movable block 640 rotates with respect to the support shaft 630, the torsion spring 620 may be twisted to store elastic potential energy. In some embodiments, the movable block 640 may be fixedly connected to the sleeve 610, and the rotation of the rotation shaft 20 may drive the sleeve 610 to rotate, thereby driving the movable block 640 to rotate, so that the torsion spring 620 is twisted to store energy.

In some embodiments, the movable block 640 is further mounted with a locking structure, and the locking structure may lock the movable block against rotation relative to the support shaft 630, so that the sleeve 610 and the rotation shaft 20 cannot rotate, that is, the display screen body 10 is maintained in a certain state. In some embodiments, the locking structure includes a locking button, and the locking structure may be controlled by the locking button to lock the movable block 640, so as to limit rotation of the rotation shaft 20. In some embodiments, when the display screen body 10 is required to be unfolded, the rotation shaft 20 rotates in the second rotation direction, and the movable block 640 may be locked by the locking button when the rotation shaft 20 rotates to a desired position, so that the rotation shaft 20 cannot rotate, and the rotation shaft 20 cannot return to the curled state under the action of the torsion spring 620, that is, the display screen body 10 is maintained in the unfolded state. If the locked state of the movable block 640 is released when the display screen body 10 is in the unfolded state, the torsion spring 620 can release elastic potential energy and drive the movable block 640 to rotate in the first rotation direction, thereby driving the rotation shaft 20 to rotate in the first rotation direction, so that the display screen body 10 is automatically returned to the curled state.

Some embodiments of the application drive the rotation shaft 20 to rotate with the return force of the torsion spring 620 restoring deformation, so as to automatically achieve curling and unfolding of the display screen body 10 and the support member 410. In addition, the display screen body 10 can be maintained in the current state by the locking button of the movable end of the torsion spring 620. When the display screen body 10 is in the unfolded state, one-button storage of the display screen body may be also achieved by pressing the locking button, and the operation is convenient, requires no electric drive supply, has a simple structure and is energy-saving and environment-friendly.

In some embodiments, during curling of the flexible display device, the display screen body 10 with a relatively large width is prone to deviation and misalignment, where the screen surface on the inner layer and the screen body on the outer layer are in a poor alignment. During unfolding, the flexible and thin display screen body 10 may be wrinkled and twisted to affect the display effect. Also, the support member 410 may also be deviated or twisted during unfolding and curling. Therefore, in some embodiments, the flexible display device may further include a guide structure, and the display screen body 10 can be curled or unfolded in a predetermined direction of the guide structure. The addition of the guide structure make the display screen body 10 and the support member 410 limited and fit better when being unfolded, so as to ensure flat and close abutting joint between the display screen body 10 and the support member 410, and at the same time, the display screen body 10 and the support member 410 may be curled up more flatly.

In some embodiments, the guide structure may be disposed on the curling path of the display screen body 10 and/or the support member 410. For example, at the position of the housing outlet 301, a guide cylinder or a guide groove may be provided along the separate path of the display screen body 10 and the support member 410 respectively, so that the display screen body and the support member are more easy to be curled separately, and also a guide effect may be provided to make the display screen body and the support member curled more flatly. In some embodiments, the guide structure may also be disposed at the curling-start side end of the display screen body 10 and the support member 10. For example, a guide groove for limiting the trend of the display screen body is disposed at the rotation shaft 20, and a guide protrusion plate for limiting the support member 410 is disposed at the position of the rotation ring 4202, so that the display screen body 10 and the support member 410 can move along a predetermined path during the stretching and contraction process. In some embodiments, the guide structure may include a support member guide structure and a display screen body guide structure, respectively, to provide guidance in movement direction for the support member 410 and the display screen body 10 during movement.

In some embodiments, further referring to FIG. 16, the support member guide structure may further include a guide wheel 540 and a guide post rod 550 fixed to the housing 30. In some embodiments, the guide wheel 540 may be used to guide the support member 410 to maintain a predetermined path for movement during curling or unfolding. In some embodiments, the guide post rod 550 may be used to guide the display screen body 10 to maintain a predetermined path for movement when being curled or unfolded.

In some embodiments, the guide structure of the display screen body may employ the spiral groove 210 of one or more of the preceding embodiments. The spiral groove 210, on the one hand, provides movement guidance for the display screen body 10, and on the other hand, can prevent the display screen body 10 from being worn during curling. Regarding the specific structure of the spiral groove 210, reference may be made to other sections of the description, and is not repeated here.

In some embodiments, the material of the support member 410 may be selected according to the environment of use, and the material is required to meet a certain rigidity requirement to stably support the display screen body and also have good flexibility capable of being repeatedly curled. In some embodiments, the material of the support member 410 may be the same as or different from the material of the bordure in one or more embodiments described above. In some embodiments, the material of the support member 410 may include, but is not limited to, flexible plastic, photo-curable materials, ultra-thin metal alloy, textile material and the like. In some of the embodiments, the flexible plastic may include any one or a combination of two or more of the following materials: thermoplastic polyurethane elastomer (TPU) material, silica gel, rubber, polyimide (PI) material, polyvinylchloride (PVC) material, polyethylene terephthalate (PET) material and the like. In some embodiments, the photocurable material may include any one or a combination of two or more of the following materials: acrylate material, polyurethane ultraviolet photocurable (UV) coating, photosensitive resin and the like. In some embodiments, the ultra-thin metal alloy may include any one or a combination of two or more of the following materials: aluminum alloy, nickel alloy, titanium alloy and the like. In some embodiments, the textile material may include any one or a combination of two or more of the following materials: leather, cloth, silk and the like.

In some embodiments, the functional auxiliary structure includes a liquid spray structure. In some embodiments, the liquid spray structure may be used to spray a liquid toward the display screen body 10, and the liquid may form a membrane layer on the surface of the display screen body 10. In some embodiments, the membrane layer may be an isolation membrane layer 110 for isolating the display screen body between two adjacent turns during curling and storage, so as to prevent abrasion of the display screen body 10 during storage, as shown in FIGS. 19B and 19C. In some embodiments, the membrane layer may also be a support membrane layer 120 for supporting the display screen body 10 in the unfolded state, making the display screen body 10 more easy to be kept flat during displaying, as shown in FIGS. 20B and 20C.

Figure 19A:
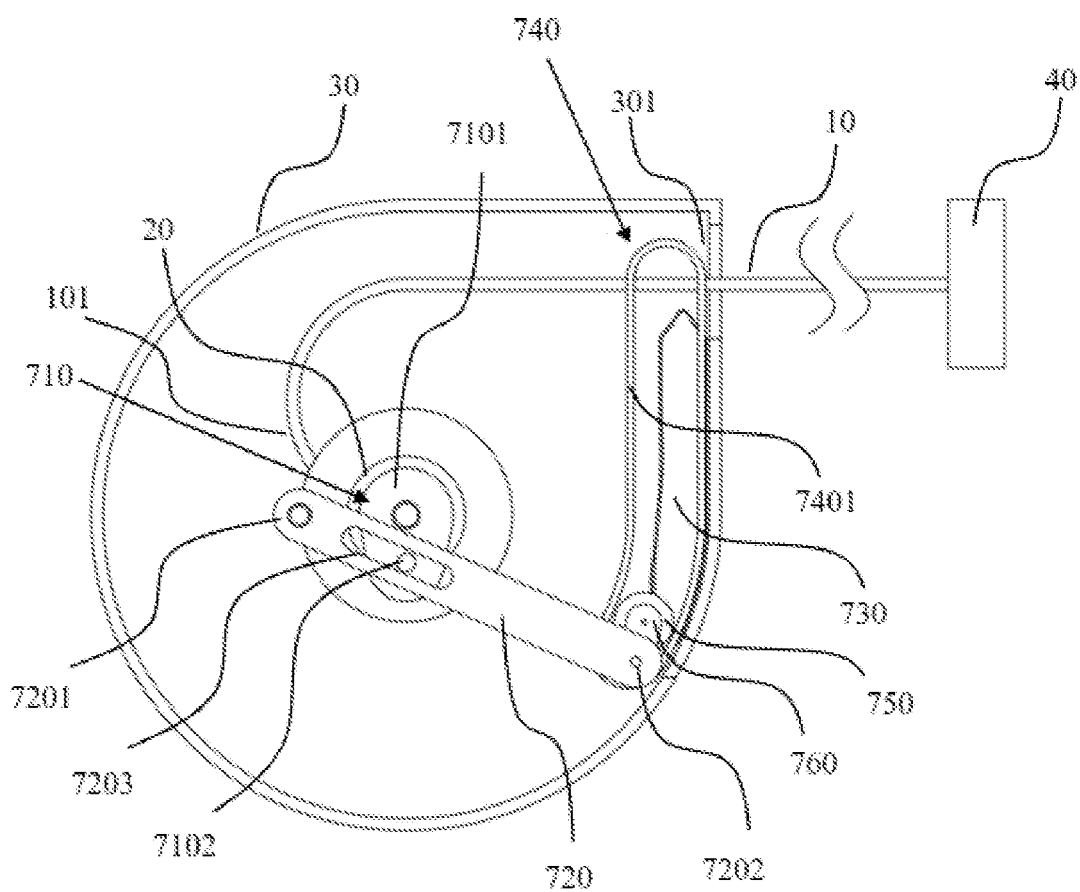
FIGS. 19A-19C are schematic views of a motion state of a liquid spray structure according to some embodiments of the application.
Figure 19B:
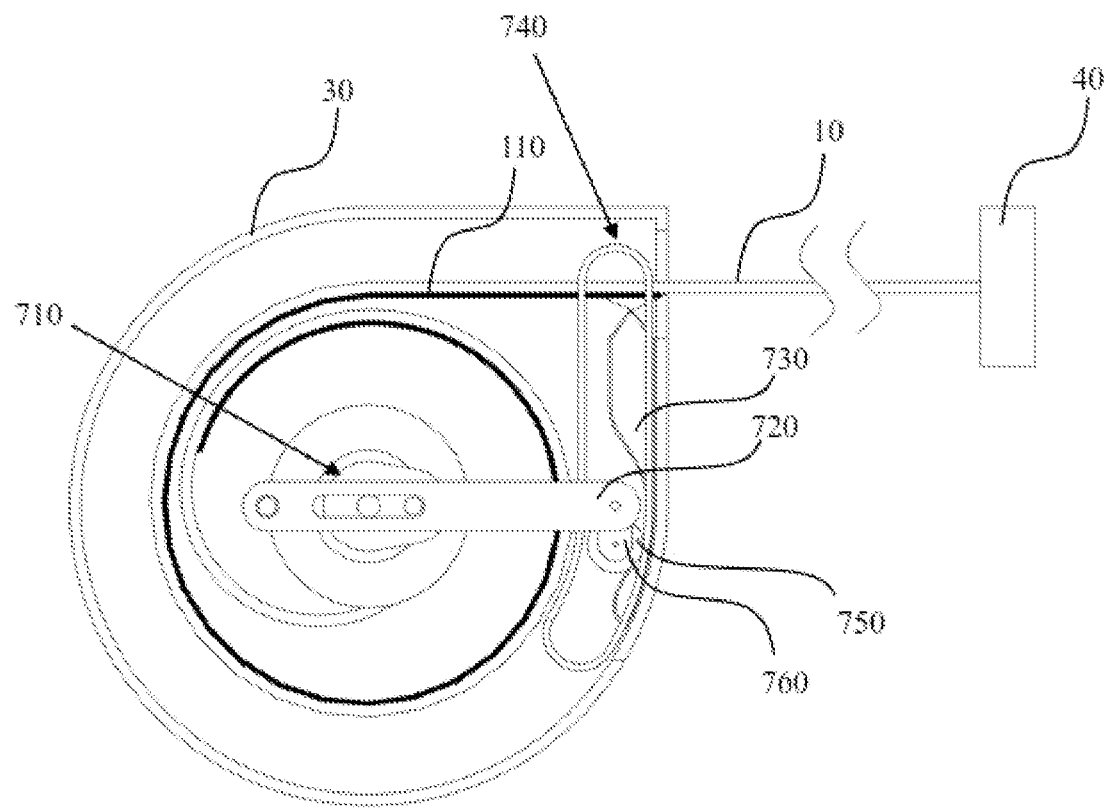
Figure 19C:
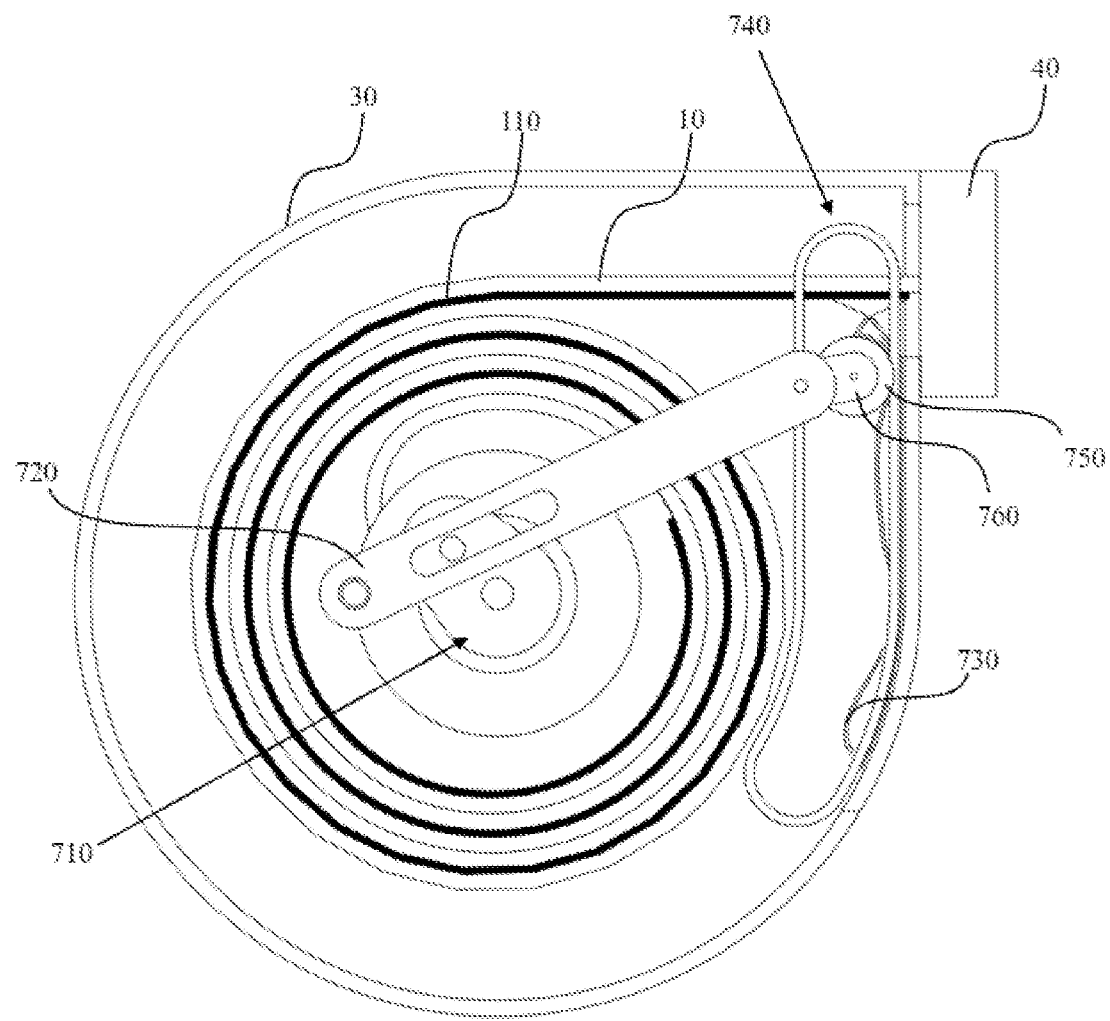

In some embodiments, referring to FIG. 19A, the flexible display device may include a rotation shaft 20, and the rotation shaft 20 is connected to the starting end 101 of the display screen body 10. In some embodiments, the liquid spray structure may include a rotation eccentric member 710 driven by the rotation shaft 20 to rotate, and a swing lever 720 connected to the rotation eccentric member 710. Herein the rotation eccentric member 710 may drive the swing lever 20 to reciprocate. The liquid may be sprayed once every time the swing lever 20 is reciprocated, Details of the sprayed liquid will be described later in detail.

In some embodiments, the rotation eccentric member 710 may be fixedly connected to the rotation shaft 20, and when the rotation shaft 20 rotates, the rotation eccentric member 710 may rotate synchronously with the rotation shaft 20. In some embodiments, the rotation eccentric member 710 may also be connected to the rotation shaft 20 through a transmission component, and the transmission component may transmit the rotation of the rotation shaft 20 to the rotation eccentric member 710 so as to drive the rotation eccentric member 710 to rotate. In some embodiments, the transmission component may cause the rotation shaft 20 to be synchronously driven with the rotation eccentric member 710, i.e., the rotation shaft 20 rotates at the same speed as the rotation eccentric member 710. In some embodiments, the transmission component may also be disposed as desired such that there is a speed difference between the rotation shaft 20 and the rotation eccentric member 710.

In some embodiments, the rotation speed of the rotation shaft 20 may be greater than the rotation speed of the rotation eccentric member 710. Correspondingly, the rotation speed ratio of the rotation shaft 20 to the rotation eccentric member 710 may have a numerical value range of 1:20-20:1; in some embodiments, the rotation speed ratio may have a numerical value range of 1:15-15:1; in some embodiments, the rotation speed ratio may have a numerical value range of 1:10 to 10:1; in some embodiments, the rotation speed ratio may have a numerical value range of 1:5-5:1; in some embodiments, the rotation speed ratio may have a numerical value range of 1:1-5:1; in some embodiments, the rotation speed ratio may have a numerical value range of 1:1-2:1. In some embodiments, the rotation speed of the rotation shaft 20 may also be less than the rotation speed of the rotation eccentric member 710. Correspondingly, the rotation speed ratio of the rotation shaft 20 to the rotation eccentric member 710 may be 1:20-20:1; in some embodiments, the rotation speed ratio may have a numerical value range of 1:15-1:1; in some embodiments, the rotation speed ratio may have a numerical value range of 1:10 to 1:1; in some embodiments, the rotation speed ratio may have a numerical value range of 1:8-1:1; in some embodiments, the rotation speed ratio may have a numerical value range of 1:5-1:1. When the rotation speed of the rotation shaft 20 is greater than the rotation speed of the rotation eccentric member 710, the greater the speed difference between the rotation shaft 20 and the rotation eccentric member 710 is, may shows that the greater the curling speed of the display screen body 10 is, and the less the reciprocating times of the swing lever is, the less liquid is sprayed. When the rotation speed of the rotation shaft 20 is less than the rotation speed of the rotation eccentric member 710, the greater the speed difference between the rotation shaft 20 and the rotation eccentric member 710 is, may shows that the less the curling speed of the display screen body 10 is, and the greater the reciprocating times of the swing lever is, the more liquid is sprayed. In the specific design, the speed difference between the rotation shaft 20 and the rotation eccentric member 710 may be set according to the actual requirements.

In some embodiments, the flexible display device further includes a housing 30, and the rotation shaft 20 is received in the housing 30. In some embodiments, a first end 7201 of the swing lever 720 is pivotably disposed on the housing 30, and a free end 7202 of the swing lever 720 may swing around the first end 7201. In some embodiments, the first end 7201 of the swing lever 720 may be interpreted as an end of the swing lever 720 close to the rotation shaft 20, and the free end 7202 of the swing lever 720 may be interpreted as an end of the swing lever 720 away from the rotation shaft 20.

In some embodiments, the swing lever 720 is provided with a slide groove 7203, and the rotation eccentric member 710 may be connected to the swing lever 720 through the slide groove 7203. In some embodiments, the slide groove 7203 may be a waist-shaped groove or a rectangular groove. In some embodiments, the rotation eccentric member 710 may include a rotation cam 7101 and a connection slide bar 7102. In some embodiments, the rotation cam 7101 may be fixedly connected to the rotation shaft 20 or the transmission component such that the rotation cam 7101 may rotate with the rotation shaft 20 or transmission component. Herein for further description of the connection type between the rotation cam 7101 and the rotation shaft 20, please refer to the previous connection type of the rotation eccentric member 710 and the rotation shaft 20.

In some embodiments, the rotation cam 7101 is fixedly connected to the connection slide bar 7102, and the rotation of the rotation cam 7101 may also drive the connection slide bar 72 to rotate. Here, the connection slide bar 7102 is offset from the rotation center of the rotation cam 7101. In some embodiments, the connection slide bar 7102 is disposed in the slide groove 7203 and may slide relative to the swing lever 720 in the guide groove 7230. In some embodiments, when the rotation cam 7101 rotates, the connection slide bar 7102 may rotate around the rotation center of the rotation cam 7101. Since the movement of the connection slide bar 7102 relative to the swing lever 720 is a movement only within the slide groove 7203 on the swing lever 720, thus, the rotation of the connection slide bar 7102 around the rotation center of the rotation cam 7101 may drive the swing lever 720 to swing around the first end 7201.

In some embodiments, the rotation eccentric member 710 may include an eccentric pin. Herein, the eccentric pin may be disposed at a position offset from the rotation center of the rotation shaft 20 on the end surface of the rotation shaft 20. In some embodiments, the first end of the eccentric pin may be fixedly connected to the rotation shaft 20, and the second end of the eccentric pin may be mounted in the slide groove 7203 and may slide relative to the swing lever 720 in the guide groove 7230. When the rotation shaft 20 rotates, the eccentric pin may rotate around the rotation center of the rotation shaft 20, so as to drive the swing lever 720 to swing around the first end 7201.

In some embodiments, the swing angle of the free end 7202 around the first end 7201 of the swing lever 720 may be any numerical value between 20° and 90°; in some embodiments, the angle range may be any numerical value between 30° and 80°; in some embodiments, the angle range may be any numerical value between 40° and 70°; in some embodiments, the angle range may be any numerical value between 45° and 60°.

In some embodiments, as shown in FIGS. 19A and 19B, the liquid spray structure further includes a liquid storage bag 730 fixed to the housing 30. The liquid storage bag 730 has liquid stored inside. The liquid storage bag 730 includes a liquid outfall 7301, and the display screen body 10 passes on the front side of the liquid outfall 7301 during unfolding. In some embodiments, the liquid outfall 7301 faces towards the outfall 2201 of the spiral groove 210. In some embodiments, the free end 7202 of the swing lever 720 is provided with a press portion capable of moving with the free end 7202. The press portion can contact with the liquid storage bag 730 during the reciprocating movement of the swing lever 720, thereby achieve pressing of the liquid storage bag 730, so that the liquid in the liquid storage bag 730 is pressed and sprayed. In some embodiments, the liquid outfall 7301 is disposed relative to the back surface of the display screen body 10, i.e., the liquid may be sprayed from the liquid outfall 7301 and form a membrane layer on the back surface of the displays screen body 10. In some embodiments, the liquid outfall 7301 may also be disposed relative to the front surface of the display screen body 10, i.e., the liquid may be sprayed from the liquid outfall 7301 and form a membrane layer on the front surface of the display screen body 10.

In some embodiments, the ratio of the length of the liquid outfall 7301 of the liquid storage bad parallel to the second direction 1002 to the width of the display screen body 10 in the second direction may be 0.5-1; preferably, may be 0.8-1; more preferably, may be 1. In some embodiments, when the length of the liquid storage bad 730 parallel to the second direction 1002 is substantially the same as the width of the display screen body 10 (e.g., the ratio is greater than 0.8), the liquid sprayed from the liquid spray structure may cover the entire back surface of the display screen body 10, that is, a membrane layer may be formed on the entire back surface of the display screen body 10.

In some embodiments, as shown in FIGS. 19A and 19B, the liquid spray structure further includes a rail portion 740 fixed on the housing 30, and the liquid storage bag 730 is fixedly disposed along the rail portion 740. In some embodiments, the press portion may move along the rail portion 740 and press the liquid storage bag 730 disposed along the railway portion 740 during movement.

In some embodiments, the rail portion 740 may include a rail groove 7401. The liquid storage bag 730 may be disposed along the rail groove 7401, and the press portion may move along the rail groove 7401. In some embodiments, the press portion may include a first press member 750 and a press connection member 760. The two ends of the press connection member 760 are rotatably connected to the first press member 750 and the free end 7202 of the swing lever 720, so that the swing lever 720 may drive the first press member 750 to move through the press connection member 760. In some embodiments, the first press member 750 may be mounted inside the groove body of the rail groove 7401 and may slide along the groove body for contacting the liquid storage bag 730 and pressing the liquid in the liquid storage bag 730 to spray the liquid. In some embodiments, the shape of the rail groove 7401 may be set as a shape facilitating spraying of liquid by the liquid storage bag 730. In some embodiments, one end of the rail groove 7401 close to the display screen body 10 may be perpendicular to the plane in which the display screen body 10 is located, so that the liquid storage bag 730 may spray the liquid vertically to the back surface of the display screen body 10. In some embodiments, the distance of the first press member 750 from the free end 7202 of the swing lever 720 may vary with the position of the second press member 750 when the first press member 750 slides within the rail groove 7401. Herein, by the rotation of the press connection member 760, a good connection state between the first press member 750 and the swing lever 720 may be achieved.

In some embodiments, the first press member 750 may include a roller, and the roller may roll and/or slide along the groove body in the rail groove 7401. In some embodiments, the roller may be a cylindrical roller, and the axis of the roller may be disposed in a direction parallel to the second direction 1002. In some embodiments, the diameter of the roller may be slightly less than the width of the rail groove 7401. In some embodiments, the ratio of length of the roller to the liquid storage bag 730 parallel to the second direction 1002 may be 0.5-1.2; preferably, may be 0.8-1.2; and more preferably, may be 1-1.2. In some embodiments, when the length of the roller parallel to the second direction 1002 is equal to or greater than the length of the liquid storage bag 730 parallel to the second direction 1002, the spraying of liquid from the liquid storage bag 730 may be facilitated, reducing residue.

In some embodiments, the rail portion 740 may include a guide curved surface having a curved shape corresponding to a reciprocating motion trajectory of the free end 7202 of the swing lever 720. Herein, the guide curved shape of the guide curved surface corresponding to the reciprocating motion trajectory may be interpreted as that the curved shape of the guide curved surface is substantially the same as the shape of the reciprocating motion trajectory. In some embodiments, there is a distance between the curved shape of the guiding curved surface and the reciprocating motion trajectory for disposing the liquid storage bag 730. In some embodiments, the liquid storage bag 730 may be disposed along the guide curved surface. In some embodiments, the press portion may include a second press member disposed at the free end 7202 of the swing lever 720, and the second press member is connected to the free end 7202 of the swing lever 720. In some embodiments, the second press member may move along the guide curved surface and press the liquid storage bag 730 disposed along the guide curved surface. In some embodiments, when the second press member moves along the guide curved surface, the distance from the free end 7202 of the swing lever 720 is always kept constant, so that the second press member may be directly connected to the free end 7202, that is, the second press member and the free end 7202 may have no relative movement in the length direction of the swing lever 720. In some embodiments, the connection may be either a fixed connection or a rotatable connection. The second press member may slide along the guide curved surface if the connection is a fixed connection; the second press member may roll along the guide curved surface, if the connection is a rotatable connection. In some embodiments, the structural form of the second press member may include, but is not limited to, a roller, a fixed press head and the like. In some embodiments, the second press member may also be a part of the swing lever 720, i.e., the free end of the swing lever 720 may directly contact with the liquid storage bag 730 as a press portion and press the liquid.

In some embodiments, the liquid spray structure in one or more embodiments may be disposed at one end of the rotation shaft 20, or may be simultaneously disposed at both ends of the rotation shaft 20. In some embodiments, the liquid spray structure may be simultaneously disposed at both ends of the rotation shaft 20. If the aforesaid liquid spray structure is provided at one end of the rotation shaft 20, in some embodiments, the corresponding side of the display screen body 10 may be partially sprayed with liquid, and at this time, the liquid outfall 7301 of the liquid storage bag 730 is required to correspond to the position of one of the sides of the display screen body 10. In some embodiments, the entire region of the display screen body 10 may be sprayed with liquid, and at this time, the length of the liquid outfall 7301 of the liquid storage bag 730 in the second direction is required to be substantially the same as the width of the display screen body 10 in the second direction.

If both ends of the rotation shaft 20 is provided with the liquid spray structure, in some embodiments, both the first side and the second side of the display screen body 10 may be partially sprayed with liquid at the same time. At this time, the liquid storage bag 730 may include two liquid storage bags disposed at the positions corresponding to the first side and the second side of the display screen body 10, and the roller may also be two rollers disposed at the corresponding positions. At this time, the liquid sprayed from the liquid storage bag may form a membrane layer on the first sides and the second side of the display screen body 10. In some embodiments, the entire region of the display screen body 10 may also be sprayed with liquid, and at this time, the length of the liquid outfall 7301 of the liquid storage bag 730 in the second direction is required to be substantially the same as the width of the display screen body 10 in the second direction. In some embodiments, the length of the rail portion parallel to the second direction may also substantially coincide with the width of the display screen body 10 in the second orientation. In some embodiments, the length of the first press member 750 (e.g., the roller) parallel to the second direction may also be substantially the same as the width of the display screen body 10 in the second direction. In some embodiments, the liquid storage bag 730 is made of plastic membrane. Herein, the plastic material for making the liquid storage bag 730 may be selected as a plastic material with good ductility and stretch resistance. On the one hand, it is possible to enable the press portion to easily press the liquid in the liquid storage bag 730 out when contacting with the liquid storage bag 730, and on the other hand, it is also possible to improve the service life of the liquid storage bag 730.

As described above, the membrane layer may be the isolation membrane layer 110, as shown in FIGS. 19B and 19C; or may also be the support membrane layer 120, as shown in FIGS. 20B and 20C. In some embodiments, if the membrane layer is the isolation membrane layer 110, the liquid in the liquid storage bag 730 may be selected as a well-lubricated, volatile material including, but not limit to, one or a mixture of two or more of ethyl alcohol, diethyl ether, acetone, chloroform, benzene, carbon disulfide, methyl alcohol, formic acid, acetic acid, formaldehyde acetaldehyde, ethyl acetate and the like. For example, the liquid may be selected as ethyl alcohol, and after forming a membrane layer on the surface of the display screen body 10, ethyl alcohol may be volatilized within 1-5 seconds, and the flexible display device may complete the operation of curling within this period. In some embodiments, if the membrane layer is the support membrane layer 120, the liquid in the liquid storage bag 730 may be selected as a material having a low freezing point (e.g., solidifying at a normal temperature), including, but not limited to, one or a mixture of two or more of paraffin, sodium thiosulfate, sodium stearate, asphalt, agar, gelatin, pectin, carrageenan and the like.

FIGS. 19A, 19B, and 19C are schematic views of several movement states of the liquid spray structure in the process of the flexible display device 200 from the unfolded state to the curled state. Herein, FIG. 19A is a schematic view of the display screen body 10 in a fully unfolded state where liquid to be pressed and sprayed during curling is contained in the liquid storage bag 730; FIG. 19B is a schematic view of a state where the display screen body 10 has completed partially curling; and FIG. 19C is a schematic view of a state where the display screen body 10 has completed curling.

In some embodiments, when the liquid spray structure sprays the liquid during the curling process of the display screen body 10, the liquid may be sprayed on the front surface of the display screen body 10 so as to form the isolation membrane layer 110.

In some embodiments, referring to FIG. 19A, when the display screen body 10 is fully unfolded, the first press member 750 (such as a roller) of the liquid spray structure may be in the initial pressing position. In some embodiments, the initial pressing position may be interpreted as a position corresponding to the bottom of the liquid storage bag 730, and the bottom of the liquid storage bag 730 is the side opposite to the liquid outfall 7301.

In some embodiments, as shown in FIGS. 19B and 19C, when the rotation shaft 20 rotates and the display screen body 10 starts to be curled up, the first press member 750 may press from the bottom of the liquid storage bag 730 (i.e., the initial pressing position) toward the liquid outfall 7301 to spray the liquid onto the front surface of the display screen body 10, so as to form the isolation membrane layer 110, thereby preventing friction and abrasion of the display screen body 10 due to mutual contact during the curling process. In some embodiments, the liquid may be a volatilizable material, and the isolation membrane layer 110 may be completely volatilized within a certain period after the display screen body 10 is completely wound, in order to prevent the isolation membrane layer from remaining on the display screen body 10 when being unfolded again.

Figure 20A:
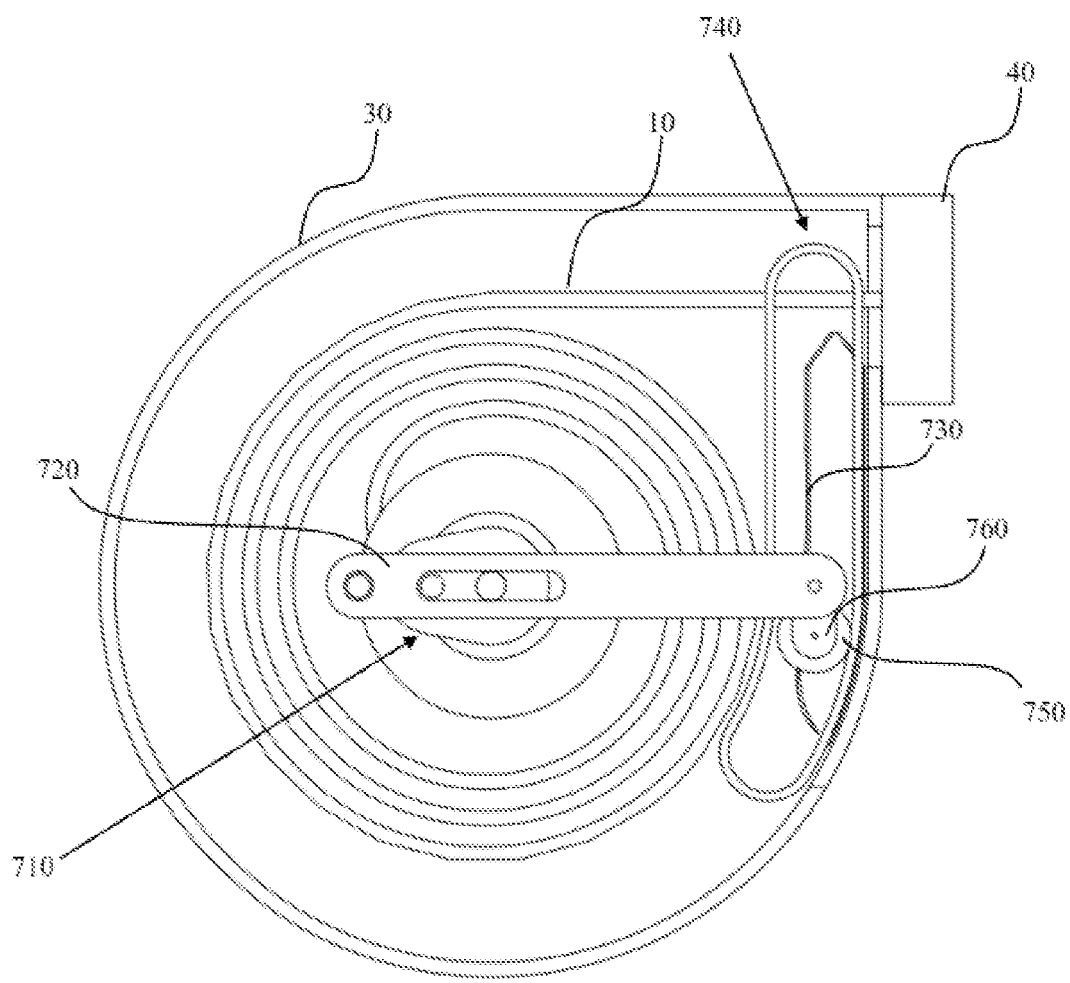
FIGS. 20A-20C are schematic views of a motion state of a liquid spray structure according to other embodiments of the application.
Figure 20B:
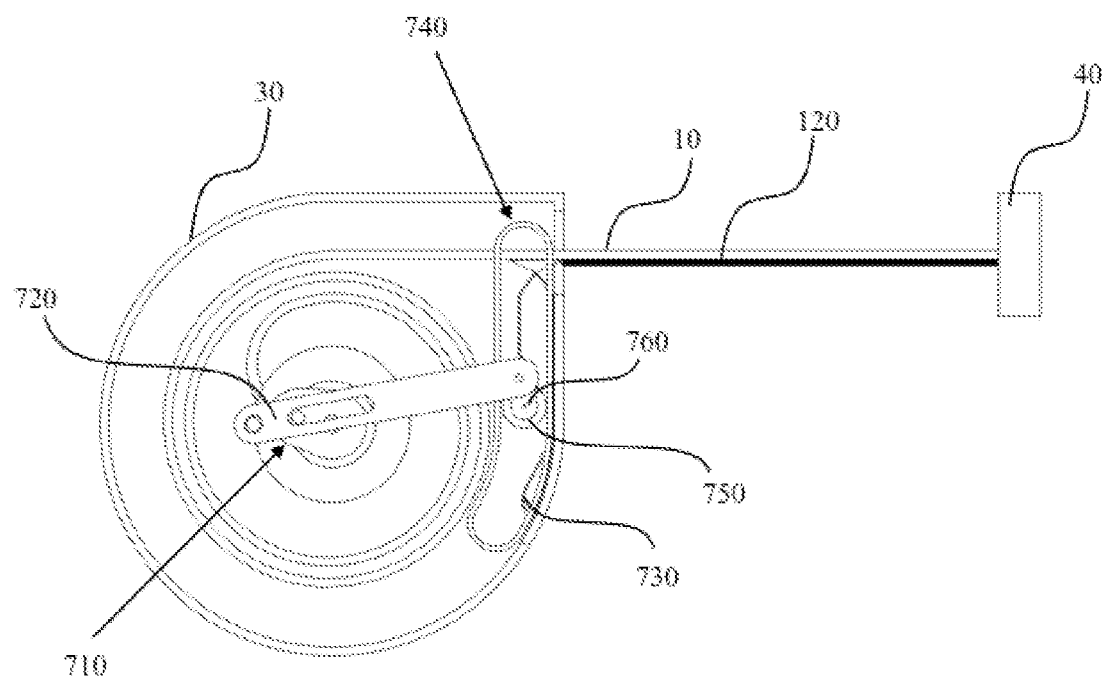
Figure 20C:
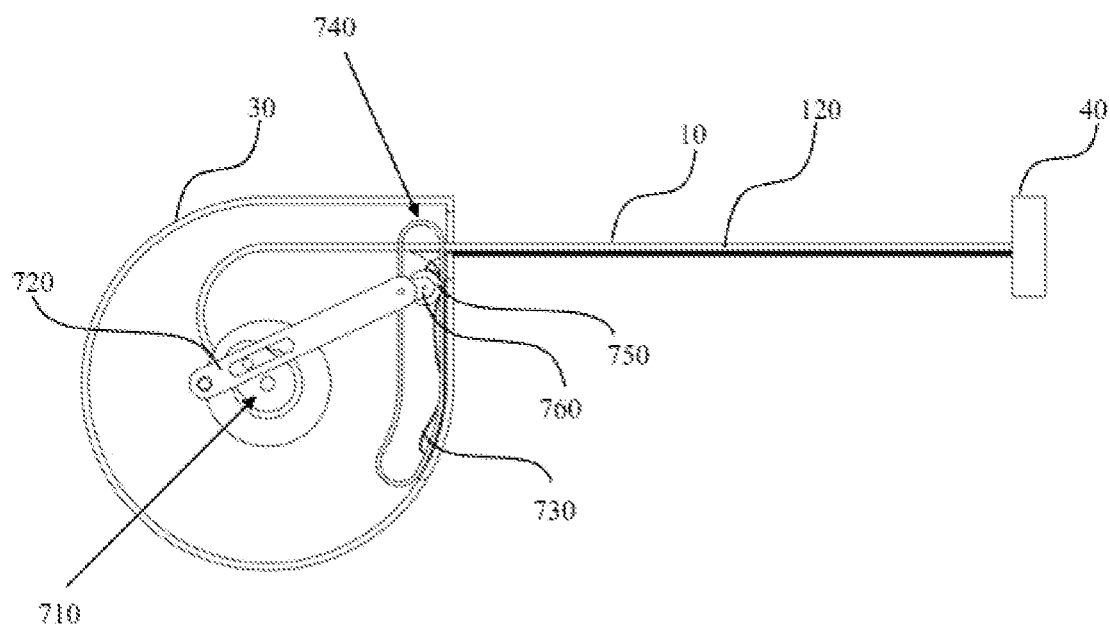

FIGS. 20A, 20B and 20C are schematic views of several movement states of the liquid spray structure in the process of the flexible display device 200 from the curled state to the unfolded state. FIG. 20A is a schematic view of the display screen body 10 in a fully curled state; FIG. 20B is a schematic view of a state where the display screen body 10 has completed unfolding; FIG. 20C is a schematic view of a state where the display screen body 10 has been fully unfolded.

In some embodiments, when the liquid spray structure sprays liquid during the unfolding process of the display screen body 10, the liquid may be sprayed on the front surface or the back surface of the display screen body 10 so as to form the support membrane layer 120.

In some embodiments, referring to FIG. 20A, when the display screen body 10 is fully curled up, the first press member 750 (such as a roller) of the liquid spray structure may be in the initial pressing position.

In some embodiments, as shown in FIGS. 20B and 20C, when the rotation shaft 20 rotates to drive the display screen body to be unfolded, the rotation shaft 20 may also drive the swing lever 720 to swing, thereby making the first press member 750 press the liquid in the liquid storage bag 730 from the bottom of the liquid storage bag 730 (i.e., the initial pressing position) toward the direction of the liquid outfall 7301, so as to spray the liquid onto the display screen body 10 to form the support membrane layer 120. In some embodiments, when the display screen body 10 is curled up, the support membrane layer may be removed so as to add no additional curling stress during the curling process. In some embodiments, the support membrane layer may be removed manually. In some embodiments, a scraper may also be provided near the housing outlet 301 of the housing 30 to automatically scrape off the support membrane layer during curling up.

In some embodiments, the application further provides a display system with a flexible display device, and the display system includes a terminal body and a flexible display device connected to the terminal body. Herein, the flexible display device may be the flexible display device in one or more embodiments of the above sections of the description. In some embodiments, the flexible display device may be fixedly connected to the terminal body, and the terminal body provides power and outputs a display signal to the flexible display device. In some embodiments, the flexible display device may also be detachably connected to the terminal body. When the display system is required to display a picture, the flexible display device may be connected to the terminal body to display the picture. When the display system is not required to display a picture, the flexible display device may be separate from the terminal body for storage of the flexible display device. Herein, the type of detachably connecting the flexible display device to the terminal body may include a pluggable wired connection. In some embodiments, the connection type between the flexible display device and the terminal body may further include a wireless connection, so as to avoid a trouble caused by a connection line between the flexible display device and the terminal body. Herein, the terminal body may include various terminal devices capable of being used in connection with a display screen, including, but not limited to, a cellphone, a computer, a television, a keyboard, an electronic book, a vehicle-mounted display terminal and the like.

Possible benefits of one or more of the embodiments disclosed in the application include, but are not limited to: (1) one of more embodiments of the application enables the flexible display device to be isolated from each other in the curled state by the isolation component, and can effectively prevent abrasion due to friction between the display screen body in the curled state; (2) the spiral groove of one or more embodiments of the application can separate the display screen body when the flexible display device is stored, and can effectively prevent the mutual abrasion between the display screen body; (3) the bordure structure of one or more embodiments of the application can not only isolate the display screen body, but also provide support for the display screen body, and the structure thereof is simple, and is convenient and easy to use; (4) the support structure of one or more embodiments of the application may be separated from the display screen body upon curling, such that the display screen body does not generate additional curling stress when being stored; (5) the structure of one or more embodiments of the application can automatically achieve abutting joint of the support structure with the display screen body when the flexible display device is unfolded, without additional operation, and is simple and practical.

As described above are only preferable embodiments of this application, which are not intended to limit the application. Any modification, equivalent substitution, improvement and the like, made within the spirit and principle of the application, shall be included in the protection scope of the application.

What is claimed is:

1. A flexible display device, comprising: a display screen body, a functional auxiliary structure connected to the display screen body to provide isolation in case that the display screen body curls up and/or support in case that the display screen body is unfolded; and a rotation shaft connected to a starting end of the display screen body, wherein the functional auxiliary structure comprises a liquid spray structure, the liquid spray structure comprises a swing lever connected to the rotation shaft, a liquid storage bag in contact with a free end of the swing lever and comprising a liquid outfall; the display screen body pass a front side of the liquid outfall during unfolding; wherein the rotation shaft rotates to drive the swing lever to reciprocate to spray a liquid in the liquid storage bag from the liquid outfall.

2. The flexible display device of claim 1, wherein the functional auxiliary structure comprises an isolation component, and at least a part of the display screen body in a curled state is isolated by the isolation component.

3. The flexible display device of claim 1, wherein the isolation component comprises a spiral groove and a draw bar connected to the display screen body, and when the display screen body is required to curl up, the display screen body enters and moves in the spiral groove via the draw bar.

4. The flexible display device of claim 3, wherein the spiral groove comprises a first spiral groove and a second spiral groove which are arranged coaxially, and the display screen body enters and moves in the first spiral groove and the second spiral groove.

5. The flexible display device of claim 3, wherein a ratio of a length of the spiral groove in an axial direction thereof to a length of the display screen body in a second direction is 0.5-1, a middle portion of a starting end of the display screen body is received in the spiral groove; the flexible display device further comprises a rotation shaft, and a groove body of the spiral groove is spirally distributed around an axis of the rotation shaft in a plane perpendicular to the rotation shaft.

6. The flexible display device of claim 5, wherein the rotation shaft is further encircled by a first spring to provide a first draw force to the rotation shaft in a first rotation direction, and a second spring is further provided between the draw bar and the rotation shaft to provide a second draw force to the draw bar toward a center of the spiral groove.

7. The flexible display device of claim 3, wherein of the spiral groove has an inner wall with an undulated shape in a direction parallel to the axis, the draw bar has an outer wall with a shape matching the undulated shape in an axial direction thereof, and the undulated shape comprises at least one of a wavy shape, a crenelated shape, and a serrated shape.

8. The flexible display device of claim 3, wherein the spiral groove further comprises a slide auxiliary structure for reducing a frictional force when the draw bar slides in the spiral groove, the slide auxiliary structure comprises a ball disposed on an inner wall of the spiral groove, and the ball is rotatably exposed in the spiral groove; or
the slide auxiliary structure comprises a polished layer and/or a lubricate coating disposed on an inner wall of the spiral groove.

9. The flexible display device of claim 3, further comprising:
a blocking structure configured to prevent the draw bar from sliding out of the spiral groove.

10. The flexible display device of claim 9, wherein the blocking structure comprises a first blocking member disposed at an outfall of the spiral groove, and the first blocking member completely or partially blocks the outfall; and the first blocking member is movable between a first position and a second position, in the first position, the first blocking member at least partially blocks the outfall, and in the second position, the outfall is not blocked by the first blocking member to be completely exposed from the first blocking member.

11. The flexible display device of claim 9, wherein the blocking structure further comprises a cover disposed at an end of the rotation shaft, and the cover covers at least a part of the outfall.

12. The flexible display device of claim 5, further comprising:
a resilient lever disposed between the draw bar and the rotation shaft, and the resilient lever is resilient in a radial direction of the spiral groove.

13. The flexible display device of claim 2, wherein the isolation component comprises a bordure structure disposed on the display screen body, the bordure structure comprises a bordure disposed on a first side and/or a second side of the display screen body; the bordure is connected with the display screen body by hot press molding or liquid curing or adhesive connection or magnetic connection; and the bordure is provided with a plurality of notches disposed on a front surface or a back surface of the display screen body, and the plurality of notches have a shape comprising at least one of a wavy shape, a crenelated shape, and a serrated shape.

14. The flexible display device of claim 1, wherein the functional auxiliary structure comprises a support component comprising a support member detachably connected to the display screen body;

the support member engages with the display screen body when the flexible display device is in an unfolded state; the support member is at least partially separated from the display screen body when the flexible display device is in a curled state.

15. The flexible display device of claim 14, further comprising:

a rotation shaft and a drive component for driving the rotation shaft to rotate, wherein the support component comprises a rotation member, a starting end of the display screen body is connected to the rotation shaft, a first end of the support member is connected to the rotation member, and a tail end of the display screen body is connected to a second end of the support member; and the support component comprises a transmission component disposed between the display screen body and the support member, and the transmission component comprises a rotation gear connected to the rotation shaft, an inner ring gear disposed on the rotation member and an intermediate gear disposed between the rotation gear and the inner ring gear to engage with both the rotation gear and the inner ring gear.

16. The flexible display device of claim 1, wherein the liquid spray structure further comprises a rotation eccentric member rotatably connected to the rotation shaft; the drive lever is connected to the rotation eccentric member, and the rotation eccentric member moves with the rotation shaft to drive the drive lever to reciprocate; a slide groove is provided in the swing lever, and the rotation eccentric member is connected to the swing lever via the slide groove.

17. The flexible display device of claim 1, wherein the liquid outfall faces toward an outfall of the spiral groove; a free end of the swing lever is provided with a press portion, the liquid spray structure further comprises a rail portion, the liquid storage bag is located at the rail portion, the rail portion comprises a rail groove, the press portion comprises a first press member and a press connecting member, and two ends of the press connecting member are rotatably connected to the first press member and the free end of the swing lever respectively; wherein the first press member is slidable in the rail groove to press the liquid storage bag.

18. The flexible display device of claim 1, wherein the rail portion comprises a guide curved surface having a curved shape corresponding to a reciprocating motion trajectory of the free end of the swing lever; the press portion comprises a second press member disposed at the free end of the swing lever, and the second press member is rotatably connected to the free end of the swing lever; and the first press member comprises a roller, and a length of the roller in an axial direction is longer than a length of the liquid storage bag parallel to the second direction.

19. The flexible display device of claim 1, wherein the liquid spray structure is disposed at two ends of the rotation shaft and a ratio of a length of the liquid outfall of the liquid storage bag parallel to the second direction to a width of the display screen body is 0.5-1.

* * * * *